United States Patent [19]

Jenkins et al.

[11] Patent Number: 5,405,900
[45] Date of Patent: Apr. 11, 1995

[54] POLYMERS CONTAINING MACROMONOMERS

[75] Inventors: Richard D. Jenkins, Hurricane; David R. Bassett, Charleston, both of W. Va.; Gregory D. Shay, Cary, N.C.

[73] Assignee: Union Carbide Chemicals & Plastics Technology Corporation, Danbury, Conn.

[21] Appl. No.: 251,588

[22] Filed: May 31, 1994

Related U.S. Application Data

[62] Division of Ser. No. 163,487, Dec. 7, 1993, Pat. No. 5,342,883, which is a division of Ser. No. 887,647, May 29, 1992, Pat. No. 5,292,843.

[51] Int. Cl.⁶ .............................................. C08L 31/00
[52] U.S. Cl. ...................................................... 524/556
[58] Field of Search ........................................ 524/556

[56] References Cited

U.S. PATENT DOCUMENTS

| | | | |
|---|---|---|---|
| 33,156 | 1/1890 | Shay et al. | 526/301 |
| 3,035,004 | 5/1962 | Glavis | 260/29.7 |
| 3,190,925 | 6/1965 | Stowe | 260/611 |
| 3,277,157 | 10/1966 | Stewart et al. | 260/486 |
| 3,341,627 | 9/1967 | Wilkinson | 260/898 |
| 3,499,876 | 3/1970 | Field et al. | 260/78.5 |
| 3,652,497 | 3/1972 | Junas et al. | 260/47 |
| 3,657,175 | 4/1972 | Zimmerman | 260/29.6 |
| 3,794,608 | 2/1974 | Evani et al. | 260/29.6 |
| 3,894,980 | 7/1975 | DeTommaso | 260/29.6 |
| 3,896,161 | 7/1975 | Borden et al. | 260/486 |
| 3,915,921 | 10/1975 | Schlatzer, Jr. | 260/17.4 |
| 3,940,351 | 2/1976 | Schlatzer, Jr. | 260/17.4 |
| 3,960,935 | 6/1976 | Semour | 260/485 |
| 4,008,202 | 2/1977 | Evani et al. | 260/47 |
| 4,075,411 | 2/1978 | Dickstein | 560/224 |
| 4,079,028 | 3/1978 | Emmons et al. | 260/29.6 |
| 4,085,167 | 4/1978 | Lewis et al. | 260/885 |
| 4,128,520 | 12/1978 | Barabas et al. | 260/29.7 |
| 4,138,381 | 2/1979 | Chang et al. | 260/29.6 |
| 4,155,892 | 5/1979 | Emmons et al. | 260/29.2 |
| 4,167,502 | 9/1979 | Lewis et al. | 260/29.6 |
| 4,226,754 | 10/1980 | Yun et al. | 260/29.6 |
| 4,228,277 | 10/1980 | Landoll | 536/90 |
| 4,230,844 | 10/1980 | Chang et al. | 526/210 |
| 4,268,641 | 5/1981 | Koenig et al. | 525/367 |
| 4,338,239 | 7/1982 | Dammann | 524/549 |
| 4,384,096 | 5/1983 | Sonnabend | 526/313 |
| 4,395,524 | 7/1983 | Emmons et al. | 526/307.2 |
| 4,421,902 | 12/1983 | Chang et al. | 526/317 |
| 4,423,199 | 12/1983 | Chang et al. | 526/307.6 |
| 4,426,485 | 1/1984 | Hoy et al. | 524/591 |
| 4,429,097 | 1/1984 | Chang et al. | 526/317 |
| 4,463,151 | 7/1984 | Schutz et al. | 526/307.5 |
| 4,464,524 | 8/1984 | Karickhoff | 526/313 |
| 4,485,209 | 11/1984 | Fan et al. | 524/801 |
| 4,496,708 | 1/1985 | Dehm et al. | 528/76 |
| 4,509,949 | 4/1985 | Huang et al. | 586/558 |
| 4,514,552 | 4/1985 | Shay et al. | 526/301 |
| 4,569,965 | 2/1986 | Engels et al. | 524/544 |
| 4,600,761 | 7/1986 | Ruffner et al. | 526/270 |
| 4,616,074 | 10/1986 | Ruffner | 526/318 |
| 4,703,080 | 10/1987 | Shay et al. | 524/555 |
| 4,722,962 | 2/1988 | Shay et al. | 524/548 |
| 4,735,981 | 4/1988 | Rich et al. | 524/247 |
| 4,764,554 | 8/1988 | Tonge | 524/558 |
| 4,801,671 | 1/1989 | Shay et al. | 526/214 |
| 4,916,183 | 7/1990 | Barron et al. | 524/555 |
| 4,939,283 | 7/1990 | Yokota et al. | 558/33 |
| 5,006,596 | 4/1991 | Chen et al. | 524/555 |
| 5,015,711 | 5/1991 | Simonet et al. | 526/301 |
| 5,023,309 | 6/1991 | Kruse et al. | 528/49 |

FOREIGN PATENT DOCUMENTS 2745872 10/1979 Germany .................. C09B 76/00
62-270608 11/1987 Japan .

OTHER PUBLICATIONS

Jenkins, R. D. et al., Associative Polymers with Novel Hydrophobe Structures, ACS Meeting, New York, New York, Aug. 26, 1991.
Nemoto, H. et al., J. Org. Chem., 1992, 57, 435.
U.S. Patent Application Ser. No. 07/304,258 (D-15741), filed Jan. 31, 1989.

*Primary Examiner*—Joseph L. Schofer
*Assistant Examiner*—N. Sarofin
*Attorney, Agent, or Firm*—G. L. Coon

[57] ABSTRACT

Polymers are disclosed which comprise:
(A) about 1–99.9 weight percent of one or more alpha, beta-monoethylenically unsaturated carboxylic acids, typically methacrylic acids;
(B) about 0–98.9 weight percent of one or more monoethylenically unsaturated monomers, typically ethyl acrylate;
(C) about 0.1–99 weight percent of one or more monoethylenically unsaturated macromonomers, and
(D) about 0–20 weight percent or greater of one or more polyethylenically unsaturated monomers. These polymers can be solubilized in water with the aid of an alkali, like ammonium hydroxide. When the polymers are added to latex paints and neutralized, the viscosity of the paint is increased, brush drag is increased, and the paint rheology is otherwise improved.

18 Claims, No Drawings

POLYMERS CONTAINING MACROMONOMERS

RELATED APPLICATIONS

This application is a Division of prior U.S. application Ser. No. 08/163,487, filed Dec. 7, 1993, now U.S. Pat. No. 5,342,883 and which is a division of application Ser. No. 07/887,647, filed May 29, 1992, now U.S. Pat. No. 5,292,843.

The following are related, commonly assigned applications, filed on an even date herewith:

U.S. patent application Ser. No. 07/887,645; U.S. patent application Ser. No. 07/887,646; U.S. patent application Ser. No. 07/887,642; U.S. patent application Ser. No. 07/887,673; U.S. patent application Ser. No. 07/887,672; U.S. patent application Ser. No. 07/887,641 now U.S. Pat. No. 5,292,828; U.S. patent application Ser. No. 07/887,648; U.S. patent application Ser. No. 07/887,643; U.S. patent application Ser. No. 07/887,644; and U.S. patent application Ser. No. 07/887,671 now abandoned; all of which are incorporated herein by reference.

BRIEF SUMMARY OF THE INVENTION

1. Technical Field

This invention relates to polymers which are soluble in, or swelled by, an aqueous alkaline medium to provide thickeners for use in aqueous coating compositions, especially latex paints.

2. Background of the Invention

Thickeners for aqueous systems are needed for various purposes, such as for architectual coatings, industrial coatings, automotive coatings and the like to improve rheology of the coatings. Hydroxyethyl cellulose is a well known thickener for aqueous systems, but it has various deficiencies in that excessive amounts must be used and the theology of the thickened system is inadequate. Various ethoxylated carboxyl-functional polymers which form alkali soluble thickeners are also known, but these have various deficiencies, including inadequate hydrolytic stability.

It has long been desired to provide superior thickeners for aqueous systems which are highly efficient, which better resist hydrolysis, and which provide better rheology. This is achieved herein by providing new polymers which possess these desired characteristics.

DISCLOSURE OF THE INVENTION

This invention relates in part to polymers comprising:
(A) about 1–99.9, preferably about 10–70, weight percent of one or more alpha, beta-monoethylenically unsaturated carboxylic acids, typically methacrylic acid;
(B) about 0–98.9, preferably about 30–85, weight percent of one or more monoethylenically unsaturated monomers, typically ethyl acrylate;
(C) about 0.1–99, preferably about 5–60, weight percent of one or more monoethylenically unsaturated macromonomers; and
(D) about 0–20, preferably about 0–10, weight percent or greater of one or more polyethylenically unsaturated monomers, typically trimethylol propane triacrylate.

This invention also relates in part to an emulsion of the above-identified polymer in water, which emulsion is useful as a thickening agent in aqueous compositions.

In order to obtain the thickening effect, the polymer is dissolved in the aqueous composition to be thickened.

This invention further relates in part to an aqueous composition, and more particularly an improved latex paint composition containing the above-defined polymer.

This invention yet further relates in part to a process for thickening an aqueous composition which comprises adding the above-defined polymer to an aqueous composition and dissolving the polymer in the aqueous composition.

DETAILED DESCRIPTION

A large proportion of one or more alpha, beta-monoethylenically unsaturated carboxylic acid monomers can be present in the polymers of this invention. Various carboxylic acid monomers can be used, such as acrylic acid, methacrylic acid, ethacrylic acid, alpha-chloroacrylic acid, crotonic acid, fumaric acid, citraconic acid, mesaconic acid, itaconic acid, maleic acid and the like including mixtures thereof. Methacrylic acid is preferred. A large proportion of carboxylic acid monomer is essential to provide a polymeric structure which will solubilize and provide a thickener when reacted with an alkali like sodium hydroxide.

The polymers of this invention can also contain a significant proportion of one or more monoethylenically unsaturated monomers. The preferred monomers provide water insoluble polymers when homopolymerized and are illustrated by acrylate and methacrylate esters, such as ethyl acrylate, butyl acrylate or the corresponding methacrylate. Other monomers which can be used are styrene, alkyl styrenes, vinyl toluene, vinyl acetate, vinyl alcohol, acrylonitrile, vinylidene chloride, vinyl ketones and the like. Nonreactive monomers are preferred, those being monomers in which the single ethylenic group is the only group reactive under the conditions of polymerization. However, monomers which include groups reactive under baking conditions or with divalent metal ions such as zinc oxide may be used in some situations, like hydroxyethyl acrylate.

Other illustrative monoethylenically unsaturated monomers useful in this invention include, for example, propyl methacrylate, isopropyl methacrylate, butyl methacrylate, n-amyl methacrylate, sec-amyl methacrylate, hexyl methacrylate, lauryl methacrylate, stearyl methacrylate, ethyl hexyl methacrylate, crotyl methacrylate, cinnamyl methacrylate, oleyl methacrylate, ricinoleyl methacrylate, hydroxy ethyl methacrylate, hydroxy propyl methacrylate, vinyl propionate, vinyl butyrate, vinyl tert-butyrate, vinyl caprate, vinyl stearate, vinyl laurate, vinyl oleate, vinyl methyl ether, vinyl ethyl ether, vinyl n-propyl ether, vinyl iso-propyl ether, vinyl n-butyl ether, vinyl iso-butyl ether, vinyl iso-octyl ether, vinyl phenyl ether, α-chlorovinyl phenyl ether, vinyl β-naphthyl ether, methacryonitrile, acrylamide, methacrylamide, N-alkyl acrylamides, N-aryl acrylamides, N-vinyl pyrrolidone, N-vinyl-3-morpholinones, N-vinyl-oxazolidone, N-vinyl-imidazole and the like including mixtures thereof.

The macromonomers useful in this invention can be represented by the formula:

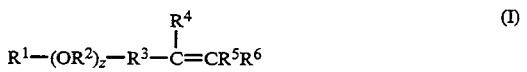

wherein:

$R^1$ is a monovalent residue of a substituted or unsubstituted complex hydrophobe compound;

each $R^2$ is the same or different and is a substituted or unsubstituted divalent hydrocarbon residue;

$R^3$ is a substituted or unsubstituted divalent hydrocarbon residue;

$R^4$, $R^5$ and $R^6$ are the same or different and are hydrogen or a substituted or unsubstituted monovalent hydrocarbon residue; and z is a value of 0 or greater.

The macromonomer compounds useful in this invention can be prepared by a number of conventional processes, except for inclusion of the complex hydrophobe compounds described herein. Illustrative processes are described, for example, in U.S. Pat. Nos. 4,514,552, 4,600,761, 4,569,965, 4,384,096, 4,268,641, 4,138,381, 3,894,980, 3,896,161, 3,652,497, 4,509,949, 4,226,754, 3,915,921, 3,940,351, 3,035,004, 4,429,097, 4,421,902, 4,167,502, 4,764,554, 4,616,074, 4,464,524, 3,657,175, 4,008,202, 3,190,925, 3,794,608, 4,338,239, 4,939,283 and 3,499,876. The macromonomers can also be prepared by methods disclosed in copending U.S. patent application Ser. No. (D-17010), which is incorporated herein by reference.

Illustrative substituted and unsubstituted divalent hydrocarbon residues represented by $R^2$ in formula I above include those described for the same type of substituents in formulae (i) and (ii) below. Illustrative substituted and unsubstituted monovalent hydrocarbon residues represented by $R^4$, $R^5$ and $R^6$ in formula I above include those described for the same type of substituents in formula (i) and (ii) below.

Illustrative $R^3$ substituents include, for example, the organic residue of ethers, esters, urethanes, amides, ureas, urethanes, anhydrides and the like including mixtures thereof. The $R^3$ substituent can be generally described as a "linkage" between the complex hydrophobe bearing surfactant or alcohol, and the unsaturation portion of the macromonomer compound. Preferred linkages include the following: urethane linkages from the reaction of an isocyanate with a nonionic surfactant; urea linkages from the reaction of an isocyanate with an amine bearing surfactant; unsaturated esters of surfactants such as the esterification product of a surfactant with of an unsaturated carboxylic acid or an unsaturated anhydride; unsaturated esters of alcohols; esters of ethyl acrylate oligomers, acrylic acid oligomers, and allyl containing oligomers; half esters of surfactants such as those made by the reaction of a surfactant with maleic anhydride; unsaturated ethers prepared by reacting vinyl benzyl chloride and a surfactant or by reacting an allyl glycidyl ether with a surfactant, alcohol, or carboxylic acid.

The oxyalkylene moieties included in the macromonomer compounds (I) may be homopolymers or block or random copolymers of straight or branched alkylene oxides. Mixtures of alkylene oxides such as ethylene oxide and propylene oxide may be employed. It is understood that each $R^2$ group in a particular substituent for all positive values of z can be the same or different.

The complex hydrophobe compounds having at least one active hydrogen useful in preparing the macromonomer compounds useful in this invention can be represented by the formula:

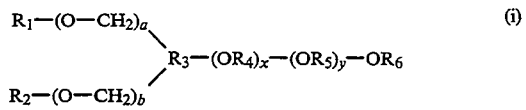
(i)

wherein $R_1$ and $R_2$ are the same or different and are hydrogen or a substituted or unsubstituted monovalent hydrocarbon residue, $R_3$ is a substituted or unsubstituted divalent or trivalent hydrocarbon residue, each $R_4$ is the same or different and is a substituted or unsubstituted divalent hydrocarbon residue, each $R_5$ is the same or different and is a substituted or unsubstituted divalent hydrocarbon residue, $R_6$ is hydrogen, a substituted or unsubstituted monovalent hydrocarbon residue or an ionic substituent, a and b are the same or different and are a value of 0 or 1, and x and y are the same or different and are a value of 0 or greater; provided at least two of $R_1$, $R_2$, $R_3$, $R_4$, $R_5$ and $R_6$ are a hydrocarbon residue having greater than 2 carbon atoms in the case of $R_1$, $R_2$ and $R_6$ or having greater than 2 pendant carbon atoms in the case of $R_3$, $R_4$ and $R_5$. For purposes of the polymers and macromonomers of formula (I) above, when z is a value of 0 and $R^1$ is the residue of a complex hydrophobe of formula (i) in which $R_1$ is hexadecyl, a is a value of 1, $R_2$ is tetradecyl, b is a value of 0, $R_3$ is

$R_4$ is $-CH_2CH(\text{tetradecyl})-$, x is a value of 1, $R_5$ is $-CH_2CH_2-$, y is a value of 34, $R_6$ is hydrogen, and the $-R^3-(R^4)C=CR^5R^6$ portion of the macromonomer is the residue of maleic anhydride, then the polymers of this invention are other than a terpolymer of said macromonomer, styrene and maleic anhydride. Also for purposes of the polymers and macromonomers of formula (I) above, when $R^2$ is $-CH_2CH_2-$, z is a value of 34 and $R^1$ is the residue of a complex hydrophobe of formula (i) in which $R_1$ is hexadecyl, a is a value of 1, $R_2$ is tetradecyl, b is a value of 0, $R_3$ is

$R_4$ is $-CH_2CH(\text{tetradecyl})-$, x is a value of 1, y is a value of 0, $R_6$ is hydrogen, and the $-R^3-(R_4)C=CR^5R^6$ portion of the macromonomer is the residue of maleic anhydride, then the polymers of this invention are other than a terpolymer of said macromonomer, styrene and maleic anhydride.

Other complex hydrophobe compounds having at least one active hydrogen useful in preparing the macromonomer compounds useful in this invention can be represented by the formula:

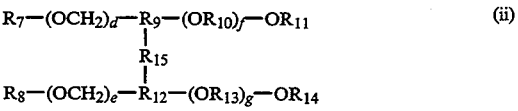
(ii)

wherein $R_7$ and $R_8$ are the same or different and are hydrogen or a substituted or unsubstituted monovalent hydrocarbon residue, $R_{11}$ and $R_{14}$ are the same or different and are hydrogen, a substituted or unsubstituted monovalent hydrocarbon residue or an ionic substituent, $R_9$ and $R_{12}$ are the same or different and are a substituted or unsubstituted divalent or trivalent hydrocarbon residue, each $R_{10}$ is the same or different and is a substituted or unsubstituted divalent hydrocarbon residue, each $R_{13}$ is the same or different and is a substituted or unsubstituted divalent hydrocarbon residue, $R_{15}$ is a substituted or unsubstituted divalent hydrocarbon residue, d and e are the same or different and are a value of 0 or 1, and f and g are the same or different and are a value of 0 or greater; provided at least two of $R_7$, $R_8$, $R_9$, $R_{10}$, $R_{11}$, $R_{12}$, $R_{13}$, $R_{14}$ and $R_{15}$ are a hydrocarbon residue having greater than 2 carbon atoms in the case of $R_7$, $R_8$, $R_{11}$ and $R_{14}$ or having greater than 2 pendant carbon atoms in the case of $R_9$, $R_{10}$, $R_{12}$, $R_{13}$ and $R_{15}$.

Illustrative substituted and unsubstituted monovalent hydrocarbon residues contain from 1 to about 50 carbon atoms or greater and are selected from alkyl radicals including linear or branched primary, secondary or tertiary alkyl radicals, such as methyl, ethyl, n-propyl, isopropyl, amyl, sec-amyl, t-amyl, 2-ethylhexyl and the like; aryl radicals such as phenyl, naphthyl and the like; arylalkyl radicals such as benzyl, phenylethyl, triphenylmethylethane and the like; alkylaryl radicals such as octylphenyl, nonylphenyl, dodecylphenyl, tolyl, xylyl and the like; and cycloalkyl radicals such as cyclopentyl, cyclohexyl, cyclohexylethyl and the like. The permissible hydrocarbon residues may contain fluorine, silicon, or other non-carbon atoms.

Preferably, the substituted and unsubstituted hydrocarbon residues are selected from alkyl and aryl radicals which contain from about 1 to 30 carbon atoms or greater. More preferably, the alkyl radicals contain from 1 to 18 carbon atoms, while the aryl, arylalkyl, alkylaryl and cycloalkyl radicals preferably contain from 6 to 18 carbon atoms or greater.

In a preferred embodiment of this invention, $R_1$, $R_2$, $R_7$ and $R_8$ can individually be a hydrocarbon radical represented by the formula:

 (iii)

wherein $R_{16}$ and $R_{17}$ are as defined for $R_1$, $R_2$, $R_7$ and $R_8$ above, h and i are the same or different and are a value of 0 or 1, and $R_{18}$ is as defined for $R_3$ above. For compounds represented by formulae (i) and (ii), it is understood that each formula (iii) radical in a given compound may be the same or different and the $R_{16}$ and/or $R_{17}$ groups may themselves be a formula (iii) radical to provide complex hydrophobes of a dendritic or of a cascading nature as described below. Further, $R_4$, $R_5$, $R_{10}$ and $R_{13}$ can individually be a hydrocarbon radical represented by the formula:

$-CH[(OR_{19})_jOR_{20}]-$ (iv)

wherein $R_{19}$ is as defined for $R_4$, $R_5$, $R_{10}$ and $R_{13}$ above, $R_{20}$ is as defined for $R_6$, $R_{11}$ and $R_{14}$ above, and j is a value of 0 or greater.

Illustrative ionic substituents for $R_6$, $R_{11}$, $R_{14}$ and $R_{20}$ include cationic and anionic substituents such as sulfates, sulfonates, phosphates and the like. $R_6$, $R_{11}$, $R_{14}$ and $R_{20}$ may preferably be an organic residue containing 1 or more hydroxyls or nitrogen derivatives or epoxides or other reactive groups which may or may not contain unsaturation.

Other illustrative terminal groups which are described by $R_6$, $R_{11}$, $R_{14}$ and $R_{20}$ include, for example, hydrocarbon residues which may contain allylic or vinylic unsaturation, acrylic or methacrylic functionality, styryl or alpha-methylstyryl functionality, and the like, such as the reaction product between the terminal alcohol ($R_6$, $R_{11}$, $R_{14}$ and $R_{20}$=H) and glycidyl methacrylate, isocyanatoethyl methacrylate, alpha, alpha-dimethyl-m-isopropenyl benzyl isocyanate (m-TMI), and the like. Other examples of terminal groups may include hydrocarbon residues of alkyl, aryl, aralkyl, alkaryl, and cycloalkyl radicals which may or may not be substituted with one or more of the following: hydroxyl, carboxyl, isocyanato, amino, mono- or disubstituted amino, quaternary ammonium, sulfate, sulfonate, phosphate, epoxy, and the like and may or may not contain other non-carbon atoms including silicon or fluorine. Also included can be divalent siloxy radicals. Other nonhydrocarbon terminal groups may include sulfates, phosphates, and the like.

Illustrative divalent hydrocarbon residues represented by $R_3$, $R_4$, $R_5$, $R_9$, $R_{10}$, $R_{12}$, $R_{13}$, $R_{15}$, $R_{18}$ and $R_{19}$ in the above formulae include substituted and unsubstituted radicals selected from alkylene, -alkylene-oxy-alkylene-, -arylene-oxy-arylene-, arylene, alicyclic radicals, phenylene, naphthylene, -phenylene-$(CH_2)_m(Q)_n(CH_2)_m$-phenylene- and -naphthylene-$(CH_2)_m(Q)_n(CH_2)_m$-naphthylene- radicals, wherein Q individually represents a substituted or unsubstituted divalent bridging group selected from $-CR_{21}R_{22}-$, $-O-$, $-S-$, $-NR_{23}-$, $-SiR_{24}R_{25}-$ and $-CO-$, wherein $R_{21}$ and $R_{22}$ individually represent a radical selected from hydrogen, alkyl of 1 to 12 carbon atoms, phenyl, tolyl and anisyl; $R_{23}$, $R_{24}$ and $R_{25}$ individually represent a radical selected from hydrogen and methyl, and each m and n individually have a value of 0 or 1. More specific illustrative divalent radicals represented by $R_3$, $R_4$, $R_5$, $R_9$, $R_{10}$, $R_{12}$, $R_{13}$, $R_{15}$, $R_{18}$ and $R_{19}$ include, e.g., 1,1-methylene, 1,2-ethylene, 1,3-propylene, 1,6-hexylene, 1,8-octylene, 1,12-dodecylene, 1,4-phenylene, 1,8-napthylene, 1,1'-biphenyl-2,2'-diyl, 1,1'-binaphthyl-2,2'-diyl, 2,2'-binaphthyl-1,1'-diyl and the like. The alkylene radicals may contain from 2 to 12 carbon atoms or greater, while the arylene radicals may contain from 6 to 18 carbon atoms or greater. Preferably, $R_3$, $R_4$, $R_5$, $R_9$, $R_{10}$, $R_{12}$, $R_{13}$, $R_{15}$, $R_{18}$ and $R_{19}$ are an alkylene or arylene radical. The permissible divalent hydrocarbon residues may contain fluorine, silicon, or other non-carbon atoms.

Illustrative trivalent hydrocarbon residues represented by $R_3$, $R_9$, $R_{12}$ and $R_{18}$ in the above formulae include substituted and unsubstituted radicals selected from

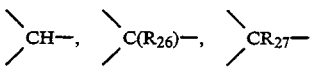

and the like, wherein $R_{26}$ is a substituted or unsubstituted monovalent hydrocarbon residue as described herein and $R_{27}$ is a substituted or unsubstituted divalent hydrocarbon residue as described herein.

Of course, it is to be further understood that the hydrocarbon residues in the above formulae may also be substituted with any permissible substituent. Illustrative substituents include radicals containing from 1 to 18 carbon atoms such as alkyl, aryl, aralkyl, alkaryl and cycloalkyl radicals; alkoxy radicals; silyl radicals such as —Si($R_{28}$)$_3$ and —Si(O$R_{28}$)$_3$, amino radicals such as —N($R_{28}$)$_2$; acyl radicals such as —C(O)$R_{28}$; acyloxy radicals such as —OC(O)$R_{28}$; carbonyloxy radicals such as —COO$R_{28}$; amido radicals such as —C(O)N($R_{28}$)$_2$ and —N($R_{28}$)CO$R_{28}$; sulfonyl radicals such as —SO$_2 R_{28}$; sulfinyl radicals such as —SO($R_{28}$)$_2$; thionyl radicals such as —S$R_{28}$; phosphonyl radicals such as —P(O)($R_{28}$)$_2$; as well as halogen, nitro, cyano, trifluoromethyl and hydroxy radicals and the like, wherein each $R_{28}$ can be a monovalent hydrocarbon radical such as alkyl, aryl, alkaryl, aralkyl and cycloalkyl radicals, with the provisos that in amino substituents such as —N($R_{28}$)$_2$, each $R_{28}$ taken together can also compromise a divalent bridging group that forms a heterocyclic radical with the nitrogen atom, in amido substituents such as —C(O)N($R_{28}$)$_2$ and —N($R_{28}$)CO$R_{28}$, each $R_{28}$ bonded to N can also be hydrogen, and in phosphonyl substituents such as —P(O)($R_{28}$)$_2$, one $R_{28}$ can by hydrogen. It is to be understood that each $R_{28}$ group in a particular substituent may be the same or different. Such hydrocarbon substituent radicals could possibly in turn be substituted with a permissible substituent such as already herein outlined above.

Preferred alkylene oxides which can provide random or block oxyalkylene units in the complex hydrophobe compounds represented by formulae (i) and (ii) include alkylene oxides such as ethylene oxide, propylene oxide, 1,2-butylene oxide, 2,3-butylene oxide, 1,2- and 2,3-pentylene oxide, cyclohexylene oxide, 1,2-hexylene oxide, 1,2-octylene oxide, 1,2-decylene oxide, and higher alpha-olefin epoxides; epoxidized fatty alcohols such as epoxidized soybean fatty alcohols and epoxidized linseed fatty alcohols; aromatic epoxides such as styrene oxide and 2-methylstyrene oxide; and hydroxy- and halogen-substituted alkylene oxides such as glycidol, epichlorohydrin and epibromohydrin. The preferred alkylene oxides are ethylene oxide and propylene oxide. Also included can be hydrocarbon residues from substituted and unsubstituted cyclic esters or ethers such as oxetane and tetrahydrofuran. It is understood that the compounds represented by formulae (i) and (ii) herein can contain random and/or block oxyalkylene units as well as mixtures of oxyalkylene units. It is further understood that each $R_4$, $R_5$, $R_{10}$, $R_{13}$ and $R_{19}$ group in a particular substituent for all positive values of x, y, f, g and j respectively can be the same or different.

The values of x, y, z, f, g and j are not narrowly critical and can vary over a wide range. For example, the values of x, y, z, f, g and j can range from 0 to about 200 or greater, preferably from about 0 to about 100 or greater, and more preferably from about 0 to about 50 or greater. Any desired amount of alkylene oxide can be employed, for example, from 0 to about 90 weight percent or greater based on the weight of the complex hydrophobe compound.

Referring to the general formulae (i) and (ii) above, it is appreciated that when $R_1$, $R_2$, $R_7$ and/or $R_8$ are a hydrocarbon residue of formulae (iii) above, the resulting compound may include any permissible number and combination of hydrophobic groups of the dendritic or cascading type. Such compounds included in the above general formulae should be easily ascertainable by one skilled in the art. Illustrative complex hydrophobe compounds having at least one active hydrogen useful in this invention and processes for preparation thereof are disclosed in copending U.S. patent application Ser. No. 07/887,648, which is incorporated herein by reference.

In a preferred embodiment of this invention, the structure shown in formula (iii) can be a residue of the reaction product between epichlorohydrin and an alcohol, including those alcohols whose residues can be described by formula (iii), or a phenolic, or a mixture thereof. The structures which result can be described as complex hydrophobes of a dendritic or of a cascading nature. Pictorially, they can be described as shown below:

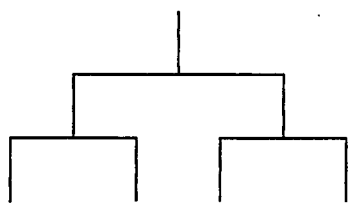

Preferred macromonomer compounds useful in this invention include those represented by the formulae:

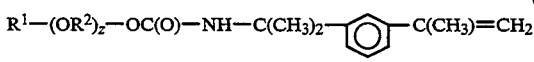

(XII)

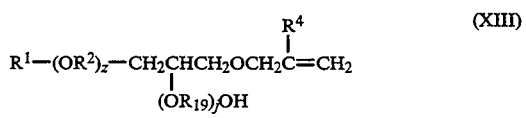

(XIII)

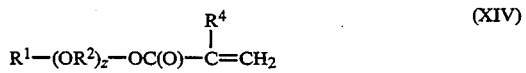

(XIV)

wherein $R^1$, $R^2$, $R^4$, $R_{19}$, z and j are as defined herein.

The macromonomer compounds useful in this invention can undergo further reaction(s) to afford desired derivatives thereof. Such permissible derivatization reactions can be carried out in accordance with conventional procedures known in the art. Illustrative derivatization reactions include, for example, esterification, etherification, alkoxylation, amination, alkylation, hydrogenation, dehydrogenation, reduction, acylation, condensation, carboxylation, oxidation, silylation and the like, including permissible combinations thereof. This invention is not intended to be limited in any manner by the permissible derivatization reactions or permissible derivatives of macromonomer compounds.

More particularly, the hydroxyl-terminated macromonomer compounds of this invention can undergo any of the known reactions of hydroxyl groups illustrative of which are reactions with acyl halides to form esters; with ammonia, a nitrile, or hydrogen cyanide to form amines; with alkyl acid sulfates to form disulfates; with carboxylic acids and acid anhydrides to form esters and polyesters; with alkali metals to form salts; with ketenes to form esters; with acid anhydrides to form carboxylic acids; with oxygen to form aldehydes and carboxylic acids; ring-opening reactions with lactones, tetrahydrofuran; dehydrogenation to form aldehydes, isocyanates to form urethanes, and the like.

The monoethylenically unsaturated macromonomer component is subject to considerably variation within the formula presented previously. The essence of the macromonomer is a complex hydrophobe carrying a polyethoxylate chain (which may include some polypropoxylate groups) and which is terminated with at least one hydroxy group. When the hydroxy-terminated polyethoxylate complex hydrophobe used herein is reacted with a monoethylenically unsaturated monoisocyanate, for example, the result is a monoethylenically unsaturated urethane in which a complex hydrophobe polyethoxylate structure is associated with a copolymerizable monoethylenic group via a urethane linkage.

The monoethylenically unsaturated compound used to provide the monoethylenically unsaturated macromonomer is subject to wide variation. Any copolymerizable unsaturation may be employed, such as acrylate and methacrylate unsaturation. One may also use allylic unsaturation, as provided by allyl alcohol. These, preferably in the form of a hydroxy-functional derivative, as is obtained by reacting a $C_2$–$C_4$ monoepoxide, like ethylene oxide, propylene oxide or butylene oxide, with acrylic or methacrylic acid to form an hydroxy ester, are reacted in equimolar proportions with an organic compound, such as toluene diisocyanate or isophorone diisocyanate. The preferred monoethylenic monoisocyanate is styryl, as in alpha, alpha-dimethyl-m-isopropenyl benzyl isocyanate. Other suitable organic compounds include, for example, monoethylenically unsaturated esters, ethers, amides, ureas, anhydrides, other urethanes and the like.

The polymers of this invention can be prepared via a variety of polymerization techniques known to those skilled in the art. The technique of polymerization influences the microstructure, monomer sequence distribution in the polymer backbone and its molecular weight to influence the performance of the polymer. Illustrative polymerization techniques include, for example, conventional and staged emulsion polymerization via batch, semi-continuous, or continuous processes, micellar polymerization, inverse emulsion polymerization, solution polymerization, non-aqueous dispersion polymerization, interfacial polymerization, emulsion polymerization, suspension polymerization, precipitation polymerization, addition polymerizations such as free radical, anionic, cationic or metal coordination methods, and the like.

The thickeners of this invention possess structural attributes of two entirely different types of thickeners (those which thicken by alkali solubilization of a high molecular weight entity, and those which thicken due to association), and this may account for the superior thickener properties which are obtained herein.

The aqueous emulsion copolymerization is entirely conventional. To obtain an estimate of thickening efficiency, the product can be diluted with water to about 1% solids content and then neutralized with alkali. The usual alkali is ammonium hydroxide, but sodium and potassium hydroxide, and even amines, like triethylamine, may be used for neutralization. The neutralized product dissolves in the water to provide an increase in the viscosity. In the normal mode of addition, the un-neutralized thickener is added to a paint and then neutralized. This facilitates handling the thickener because it has a lower viscosity before neutralization. This procedure also makes more water available for the paint formulation.

The polymers of this invention are preferably produced by conventional aqueous emulsion polymerization techniques, using appropriate emulsifiers for emulsifying the monomers and for maintaining the polymer obtained in a suitable, dispersed condition. Commonly used anionic surfactants such as sodium lauryl sulfate, dodecylbenzene sulfonate and ethoxylated fatty alcohol sulfate can be used as emulsifiers. The emulsifier may be used in a proportion of ½ to 6% of the weight monomers.

Preferably, water-soluble initiators such as alkali metal or ammonium persulfate are used in amounts from 0.01 to 1.0% on the weight of monomers. A gradual addition thermal process employed at temperatures between 60° C. to 100° C. is preferred over redox systems.

The polymerization system may contain small amounts (0.01 to 5% by weight, based on monomer weight) of the chain transfer agent mercaptans such as hydroxyethyl mercaptan, $\beta$-mercaptopropionic acid and alkyl mercaptans containing from about 4 to 22 carbon atoms, and the like. The use of mercaptan modifier reduces the molecular weight of the polymer and therefore its thickening efficiency.

The polymers of this invention may further be modified by introducing an amount of component (D), namely, one or more polyethylenically unsaturated copolymerizable monomers effective for crosslinking, such as diallylphthalate, divinylbenzene, allyl methacrylate, trimethylol propane triacrylate, ethyleneglycol diacrylate or dimethacrylate, 1,6-hexanediol diacrylate or dimethylacrylate, diallyl benzene, and the like. Thus, from about 0.05 or less to about 20% or greater of such polyethylenically unsaturated compound based on total weight of monomer may be included in the composition forming the polymer. The resulting polymers are either highly branched or in the form of three-dimensional networks. In the neutralized salt form, those networks swell in an aqueous system to act as a highly efficient thickener.

Other illustrative polyethylenically unsaturated monomers useful in this invention include, for example, any copolymerizable compound which contains two or more nonconjugated points of ethylenic unsaturation or two or more nonconjugated vinylidene groups of the structure, $CH_2=C=$, such as divinyltoluene, trivinylbenzene, divinylnaphthalene, trimethylene glycol diacrylate or dimethacrylate, 2-ethylhexane-1,3-dimethyacrylate, divinylxylene, divinylethylbenzene, divinyl ether, divinyl sulfone, allyl ethers of polyhdric compounds such as of glycerol, pentaerythritol, sorbitol, sucrose and resorcinol, divinylketone, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicate, triallyl tricarballylate, triallyl aconitate, triallyl citrate, triallyl phosphate, N,N-methylenediacrylamide, N,N'-methylenedimethacrylamide, N,N'-ethylidenediacrylamide and 1,2-di-($\alpha$-methylmethylenesulfonamide)-ethylene.

The polymer may be utilized in a variety of ways to provide the thickener or thickened compositions of this invention. For example, the polymer, while in aqueous dispersion or dry form, may be blended into an aqueous system to be thickened followed by addition of a neutralizing agent. Alternatively, the polymer may first be neutralized in aqueous dispersion form and then blended with the aqueous system. Preferably, if co-thickening by a surfactant is desired, the components are separately blended (as dry components or as dispersions or slurries) into an aqueous dispersion to be thickened, followed by the neutralization step. Although aqueous concentrates of the polymer in acid form and the surfactant may be formed and added to an aqueous dispersion to be thickened as needed, followed by neutralization, such concentrates tend to be too viscous for easy handling. It is nevertheless possible to prepare either a dry blend or an aqueous, high solids composition which is sufficiently low in viscosity as to be pumpable or pourable, and then to further thicken the admixture by addition of an alkaline material.

The polymer thickener may be provided in a dry state in number of ways. For example, the unneutralized polymer may be spray or drum dried and, if desired, blended with a surfactant co-thickener. However, it is also possible to spray dry or otherwise dehydrate the neutralized polymer thickener, and then reconstitute the aqueous thickener dispersion at a future time and place by agitation in a aqueous medium, provided the pH of the dispersion is maintained at pH 7 or higher.

The more usual method of application of the dispersion of this invention for aqueous thickening is to add the aqueous dispersion of the polymer to the medium to be thickened and, after mixing, to introduce an alkaline material to neutralize the acid. The major portion of the thickening effect is obtained in a few minutes upon neutralization. In the presence of high concentrations of electrolytes, the viscosity development may take much longer. This method of applying a polymer to an aqueous system before neutralization enables one to handle a high solids thickener in a non-viscous state, to obtain uniform blend, and then to convert to a highly viscous condition by the simple addition of an alkaline material to bring the pH of the system to 7 or above.

The aqueous solutions thickened with the neutralized polymers of this invention exhibit good viscosity stability even at a pH as high as 13.

The polymer may be used to thicken compositions under acidic conditions in the presence of a relatively large amount of surfactants wherein the thickened composition, for example, an aqueous system, has a pH below 7, even as low as 1.

An enhancement of thickening (herein termed "co-thickening") can result upon the addition of a surfactant to an aqueous system containing the polymer of this invention, when the polymer is neutralized. In some cases the thickening can be enhanced up to about 40 times the viscosity afforded by the neutralized polymer alone. A wide range of surfactants may be used. Although trace amounts of surfactant may be residually present from the polymerization of the monomers comprising the polymer (for example, whatever may remain of the about 1.5 weight percent surfactant on monomers), such amounts of surfactant are not believed to result in any measurable co-thickening.

On the basis of an aqueous system containing about 0.1 to 5% by weight of polymer solids, a useful amount of surfactant for optimum co-thickening is about 0.1 to 1.0% by weight of the total system. As indicated, the amounts of polymer and surfactant co-thickener may vary widely, even outside these ranges, depending on polymer and surfactant type and other components of the aqueous system to be thickened. However, the co-thickening can reach a maximum as surfactant is added and then decreases as more surfactant is added. Hence, it may be uneconomical to employ surfactant in amounts outside the stated concentrations and polymer/surfactant ratios, but this can be determined in a routine manner in each case.

The preferred method of application of the polymer and the surfactant for aqueous thickening is to add in any sequence the polymer and the surfactant to the medium to be thickened and, after mixing, to introduce an alkaline material to neutralize the acid. This method of applying polymer and surfactant to an aqueous system before neutralization enables one to handle a high solids thickener in a non-viscous state, to obtain a uniform blend, and then to convert to a highly viscous condition by the simple addition of an alkaline material to bring the pH of the system to 7 or above. However, the polymer in the aqueous system may also be neutralized before addition of the surfactant.

The surfactants which may be used include nonionics and anionics, singly or in combination, the selection necessarily depending upon compatibility with other ingredients of the thickened or thickenable dispersions of this invention. Cationic and amphoteric surfactants may also be used provided they are compatible with the polymer and other ingredients of the aqueous system, or are used in such small amounts as not to cause incompatibility.

Suitable anionic surfactants that may be used include the higher fatty alcohol sulfates such as the sodium or potassium salt of the sulfates of alcohols having from 8 to 18 carbon atoms, alkali metal salts or amine salts of high fatty acid having 8 to 18 carbon atoms, and sulfonated alkyl aryl compounds such as sodium dodecyl benzene sulfonate. Examples of nonionic surfactants include alkylphenoxypolyethoxyethanols having alkyl groups of about 7 to 18 carbon atoms and about 9 to 40 or more oxyethylene units such as octylphenoxypolyethoxyethanols, dodecylphenoxypolyethoxyethanols; ethylene oxide derivatives of long-chain carboxylic acids, such as lauric, myristic, palmitic, oleic; ethylene oxide condensates of long-chain alcohols such as lauryl or cetyl alcohol, and the like.

Examples of cationic surfactants include lauryl pyridinium chloride, octylbenzyltrimethylammonium chloride, dodecyltrimethylammonium chloride condensates of primary fatty amines and ethylene oxide, and the like.

The foregoing and numerous other useful nonionic, anionic, cationic, and amphoteric surfactants are described in the literature, such as McCutcheon's Detergents & Emulsifiers 1981 Annual, North America Edition, MC Publishing Company, Glen Rock, N.J. 07452, U.S.A., incorporated herein by reference.

In general, solvents and non-solvents (or mixtures of solvents, non-solvents, other organics and volatiles) can be used to manipulate the viscosity of polymer containing systems. In the examples herein, it is interesting to note how mineral spirits act like co-thickener, and how the water solubility of the other solvent influences how much mineral spirits can be added before the solution separates into a two phase system. The co-thickening with mineral spirits has utility in textile printing pastes, and in waterborne automotive basecoats. These systems usually contain mineral spirits (because of the pigments used therein), so that the mineral spirits provide an economical way of increasing viscosity and improving the efficiency of the thickener.

The amount of the polymer that may be dissolved in any given aqueous composition may fall within a wide range depending on the particular viscosity desired.

Thus, although any effective amount of the polymer may be employed for dissolution, typically from about 0.05 to about 20%, preferably from about 0.1 to about 5%, and most preferably from about 0.1 to about 3% by weight, based on the weight of the final aqueous composition including polymer is used.

For latex paint compositions, the polymer may be dissolved therein in an amount of from about 0.05 to about 5%, and preferably from about 0.1 to about 3% by weight, based on the weight of the total composition including polymer.

The polymers of this invention may be employed as thickeners for controlling viscosity of any aqueous based composition. An aqueous based composition is an aqueous composition as herein defined to be a composition wherein water comprises at least 10% by weight of the total composition (including 100% water).

For example, aqueous dispersions, emulsions, suspensions, solutions, slurries and the like, may be thickened by the polymers of this invention.

Typical aqueous compositions include compositions to be applied to textiles such as latex adhesives, warp sizes, backings for rugs and other pile fabrics. The polymer may also be used when thickening is desired in the purification of raw water such as the saline water used in the recovery of oil from exhausted oil wells by water flooding techniques. Other aqueous coatings compositions to which the polymer can be added for thickening purposes include drilling muds, caulks, adhesives, coating compositions such as paper coatings, furniture finishes, ink compositions, latex paints, foundary core washes, and the like.

Preferably, the polymer is used to thicken aqueous coating compositions, and more preferably latex paint compositions.

Examples of suitable latex paint compositions include those based on resins or binders of acrylonitrile, copolymers of acrylonitrile wherein the comonomer is a diene like isoprene, butadiene or chloroprene, homopolymers of styrene, homopolymers and copolymers of vinyl halide resins such as vinyl chloride, vinylidene chloride or vinyl esters such as vinyl acetate, vinyl acetate homopolymers and copolymers, copolymers of styrene and unsaturated acid anhydrides like maleic anhydrides, homopolymers and copolymers of acrylic and methacrylic acid and their esters and derivatives, polybutadiene, polyisoprene, butyl rubber, natural rubber, ethylene-propylene copolymers, olefins resins like polyethylene and polypropylene, polyvinyl alcohol, carboxylated natural and synthetic latices, epoxies, epoxy esters and similar polymeric latex materials.

Latex paint compositions are well known in the art and typically comprise an emulsion, dispersion or suspension of discrete particles of resin binder and pigment in water. Optional ingredients typicaly include thickeners, antifoam agents, plasticizers, surfactants, coalescing agents, and the like.

The polymers described herein are useful in a variety of aqueous systems, such as textile coatings (woven and nonwoven), latex paint formulations, cosmetic formulations, pigment dispersions and slurries, dentrifrices, hand lotions, liquid detergents, quenchants, agricultural chemicals, concrete additives, transmission fluids, waste water treatment (flocculants), turbulent drag reduction, aircraft anti-icing, automation coatings (OEM and refinish), architectural coatings, industrial coatings and the like.

As used herein, the term "complex hydrophobe" is contemplated to include all permissible hydrocarbon compounds having 2 or more hydrophobe groups, e.g., bis-dodecylphenyl, bis-nonylphenyl, bis-octylphenyl and the like.

For purposes of this invention, the term "hydrocarbon" is contemplated to include all permissible compounds having at least one hydrogen and one carbon atom. In a broad aspect, the permissible hydrocarbons include acyclic and cyclic, branched and unbranched, carbocyclic and heterocyclic, aromatic and nonaromatic organic compounds which can be substituted or unsubstituted.

As used herein, the term "substituted" is contemplated to include all permissible substituents of organic compounds unless otherwise indicated. In a broad aspect, the permissible substituents include acyclic and cyclic, branched and unbranched, carbocyclic and heterocyclic, aromatic and nonaromatic substituents of organic compounds. Illustrative substituents include, for example, alkyl, alkyloxy, aryl, aryloxy, hydroxy, hydroxyalkyl, amino, aminoalkyl, halogen and the like in which the number of carbons can range from 1 to about 20 or more, preferably from 1 to about 12. The permissible substituents can be one or more and the same or different for appropriate organic compounds. This invention is not intended to be limited in any manner by the permissible substituents of organic compounds.

The invention is illustrated by certain of the following examples.

EXAMPLE 1

Preparation of 1,3-Bis(nonylphenoxy)-2-propanol

To a five neck, two liter round bottom flask equipped with an addition funnel, thermometer, nitrogen dispersant tube, mechanical stirrer, and a decanting head with a water-cooled condenser were added 220 grams (1.00 mole) of nonylphenol and 250 milliliters of cyclohexane. The solution was then heated to reflux and 2.8 grams (1.3 wt. % based on nonylphenol) of potassium hydroxide in 10 milliliters of water was slowly added to the flask. After essentially all the water was recovered in the decanting head (10 milliliters+1 milliliter formed), 250.7 grams (0.91 mole) of nonylphenyl glycidyl ether as added dropwise. During the addition of the glycidyl ether, the reaction temperature was maintained between 60° and 80° C. After the addition was complete, the solution was refluxed for four hours. The contents of the flask were then washed with a five percent aqueous solution of phosphoric acid, and the organic layer was separated from the water layer and washed twice with deionized water. The reaction mixture was then placed in a one liter round bottom flask, and the remaining cyclohexane and unreacted nonylphenol were recovered by distillation, first at atmospheric pressure, then under vacuum at 0.2 mm Hg. The kettle temperature was not allowed to exceed 180° C. during the distillation to prevent discoloration of the product. The concentrated solution was then refiltered to give 425 grams of a pale-yellow liquid. End-group MW analysis gave a molecular weight of 506.8 (theoretical MW=496.8). Ir and nmr spectra were identical to previously recorded spectra for the compound.

EXAMPLE 2

Preparation of 1,3-Bis(nonylphenoxy)-2-propanol

To a five neck, two liter round bottom flask, equipped with an addition funnel, thermometer, nitrogen dispersant tube, mechanical stirrer, and a decanting head with a water-cooled condenser, were added 300 milliliters of cyclohexane and 451.7 grams (2.05 mole) of nonylphenol. The solution was then heated to reflux and 58.9 grams (1.05 mole) of potassium hydroxide in 60 milliliters of water was slowly added via the addition funnel. After essentially all the water was recovered in the decanting head (60 milliliter+19 milliliters formed), the reaction was cooled to 40° C., and 92.5 grams (1.00 mole) of epichlorohydrin was slowly added. During the addition, the reaction temperature was maintained below 60° C. by controlling the rate of epichlorohydrin addition. After all the epichlorohydrin was added, the solution was allowed to stir for one hour, and then brought to reflux for an additional three hours. The reaction mixture was then filtered under vacuum through a steam-jacketed Buchner funnel to remove the potassium chloride formed as a by-product. The filtration process was performed a total of three times to remove the majority of the salts. The reaction mixture was then placed in a one liter round bottom flask, and the remaining cyclohexane and unreacted nonylphenol were recovered by distillation, first at atmospheric pressure, then under vacuum at 0.2 mm Hg. The kettle temperature was not allowed to exceed 180° C. during the distillation to prevent discoloration of the product. The concentrated solution was then refiltered to give 275 grams of a pale-yellow liquid. End-group MW analysis gave a molecular weight of 459.7 (theoretical MW=496.8). Ir and nmr spectra were identical to previously recorded spectra for the compound.

EXAMPLE 3

Preparation of 5 Mole Ethoxylate of 1,3-Bis(nonylphenoxy)-2-propanol

To a 500 milliliter, stainless steel, high pressure autoclave was charged 200 grams (0.40 mole) of 1,3-bis(nonylphenoxy)-2-propanol, which contained a catalytic amount of the potassium salt of the alcohol as described in Example 1. After purging the reactor with nitrogen, the alcohol was heated to 130° C. with stirring, and 86.9 grams (2.0 mole) of ethylene oxide was added over a two hour period. The reaction temperature and pressure were maintained from 130° C. to 140° C. and 60 psig during the course of the reaction. After the addition of ethylene oxide was complete, the reaction mixture was held at 140° C. for an additional hour to allow all the ethylene oxide to cook out. The reaction mixture was dumped while hot, under nitrogen, and neutralized with acetic acid to yield 285 grams of a pale-yellow liquid.

EXAMPLE 4

Preparation of Adduct of Nonylphenyl Glycidyl Ether and 5 Mole Ethoxylate of 1,3-Bis(nonylphenoxy)-2-propanol To a five neck, one liter, round bottom flask equipped as in Example 1 was added 119.8 grams (0.17 mole) of the 5 mole ethoxylate of 1,3-bis(nonylphenoxy)-2-propanol and 100 milliliters of cyclohexane. The mixture was refluxed (100° C.) for one hour to remove residual water, and then cooled to 50° C. under nitrogen to add 0.5 grams of $BF_3/Et_2O$. Nonylphenyl glycidyl ether (46.0 grams, 0.17 mole) was then added to the flask over a one hour period, and the reaction was heated to reflux. After three hours at reflux, the reaction mixture was transferred to a separatory funnel, while hot, and washed with a saturated aqueous solution of sodium bicarbonate. The organic layer was separated from the water layer, and washed twice with hot deionized water. The washes were performed at 50° C. to facilitate the separation of the two layers. The water and cyclohexane were then evaporated from the organic layer, under vacuum, to yield 145 grams of a pale-yellow, viscous liquid. End-group molecular weight analysis gave a molecular weight of 880 (theoretical molecular weight=993).

EXAMPLE 5

Preparation of Poly(nonylphenol glycidyl ether)

To a 500 milliliter round bottom equipped with an overhead stirrer, nitrogen inlet, reflux condenser, additional funnel, and temperature controller was charged 1.9 grams of ethanol (22 mmoles) and 200 grams of cyclohexane. The solution was brought to 50° C. Once heated, 0.5 milliliters (4 mmoles) of $BF_3/Et_2O$ was added using a 2 milliliter syringe. Once the acid was added, 100.0 grams of nonylphenol glycidyl ether (362 mmoles) was added dropwise so as to maintain a reaction temperature of 45° C.–55° C. Once the glycidyl ether was added, the solution is refluxed for 3 hours, then cooled to about 50° C.

While hot (<60° C.) the organic was transferred to a separatory funnel and was washed once with 100 milliliters of 5% sodium bicarbonate solution. The aqueous layer was drained and the organic was washed two more times with 100 milliliter portions of deionized water. The aqueous layers were decanted and the organic was dried for at least 1 hour over magnesium sulfate. Once dry the magnesium sulfate was filtered from the organic which was stripped of solvent using a rotary evaporator. The final yield of viscous polymer was 100 grams. The GPC molecular weight was Mw=2600 and the Mn=1700 based on monodisperse polystyrene standards.

EXAMPLE 6

Ethoxylation of Poly(nonylphenol glycidyl ether)

To a 500 milliliter stainless steel Zipperclave was added 60.0 grams (0.035 moles based on an approximate molecular weight of 1700 gram/mole) of the resin prepared in Example 5 along with 0.5 grams of potassium hydroxide. The vessel was attached to an automated ethoxylation unit and was heated to 50° C. The vessel was continuously purged with nitrogen for 15 minutes and was then heated to 100° C. where it was again continuously purged with nitrogen for another 15 minutes. The vessel was then heated to 140° C. and was given a series of 6 purges by pressuring the vessel up to 80 psi, and then venting. Once the venting process was complete, the vessel was pressured to 20 psi with nitrogen.

The ethylene oxide lines were opened to the motor valves along with the main feed line on the Zipperclave. The feed was continued and the vessel pressure was regulated at 55 psi and a temperature of 140° C. The automation was designed to hold the temperature and the pressure within safe operating limits while addition of ethylene oxide proceeded through a pair of motor control valves. The feed was allowed to continue until 60.0 grams of ethylene oxide (1.362 moles) was added based on a difference weight of the feed cylinder. After the feed was complete, the reaction was allowed to continue for 1 hour after which the vessel was cooled to 60° C., purged 4 times with nitrogen to 80 psi and was dumped to a container. The final product yield was 115 grams with a theoretical yield of 120 grams. The GPC molecular weight of the product was Mw=3550 and the MN=2930 based on monodisperse polystyrene standards.

EXAMPLE 7

Preparation of Poly(phenyl glycidyl ether)

To a 500 milliliter round bottom equipped with an overhead stirrer, nitrogen inlet, reflux condenser, addition funnel, and temperature controller was charged 47.06 grams of phenol (500 mmoles) and 100 grams of toluene. The solution was brought to 50° C. Once heated, 1.0 milliliter (8 mmoles) of $BF_3/Et_2O$ was added using a 2 milliliter syringe. Once the acid was added, 68.18 grams of phenyl glycidyl ether (454 mmoles) was added dropwise so as to maintain a reaction temperature of 45° C.–55° C. Once the glycidyl ether was added, the solution is refluxed for 3 hours, then cooled to about 50° C.

While hot (<60° C.) the organic was transferred to a separatory funnel and was washed once with 100 milliliters of 5% sodium bicarbonate solution. The aqueous layer was drained and the organic was washed two more times with 100 milliliter portions of deionized water. The aqueous layers were decanted and the organic was dried for at least 1 hour over magnesium sulfate. Once dry the magnesium sulfate was filtered from the organic which was stripped of solvent using a rotary evaporator. The final yield of viscous polymer was 90.3 grams (with 11% unreacted phenol). The GPC molecular weight was Mw=470 and the Mn=310 (on average a trimer) based on monodisperse polystyrene standards.

EXAMPLE 8

Preparation of 1,3-Bis(phenoxy)-2-propanol using the Cascading Polyol Technique

To a 1 liter round bottom flask equipped with an overhead stirrer, nitrogen inlet, reflux condenser, addition funnel, and temperature controller was charged 94.11 grams of phenol (1 mole), 12.86 grams of tetraethylammonium iodide (0.05 moles), 3.00 grams of water (0.17 moles), 42.08 grams of potassium hydroxide (0.75 moles), and 250 grams of toluene. To a 100 milliliter additional funnel was charged 23.13 grams of epichlorohydrin (0.25 moles) and 50 grams of toluene. The solution was brought to 65° C. at which time the epichlorohydrin solution was added over a period of 15 minutes while maintaining a reaction temperature of 65° C.±5° C. The reaction was allowed to proceed for 48 hours.

After 48 hours, the solution was cooled down to room temperature. The toluene solution was washed with two 250 milliliters portions of deionized water. The aqueous layers were drained off, and the toluene was removed along with unreacted phenol using a rotary evaporator. The final yield of product was 64.5 grams which was 106% of theory (residual is phenol). Final product purity was about 95% as shown by GPC.

EXAMPLE 9

Dimerization of 1,3-Bis(phenoxy)-2-propanol using the Cascading Polyol Technique To a 250 milliliter round bottom flask equipped with an overhead stirrer, nitrogen inlet, reflux condenser, additional funnel, and temperature controller was charged 20.03 grams of 1,3-bis-(phenoxy)-2-propanol prepared in Example 8 (82 mmoles), 2.06 grams of tetraethylammonium iodide (8 mmoles), 0.49 grams of water (27 mmoles), 6.51 grams of potassium hydroxide (116 mmoles), and 125 grams of toluene. To a 100 milliliter addition funnel was charged 3.61 grams of epichlorohydrin (39 mmoles) and 25 grams of toluene. The solution was brought to 65° C. at which time the epichlorohydrin solution was added over a period of 15 minutes while maintaining a reaction temperature of 65° C.±5° C. The reaction was allowed to proceed for 48 hours.

After 48 hours, the solution was cooled down to room temperature. The toluene solution was washed with two 250 milliliter portions of deionized water. The aqueous layers were drained off, and the toluene was removed using a rotary evaporator. The final yield of product was 21.6 grams which was 101% of theory. GPC showed two major components of the product. The first was the starting material at about 41% (Mn=220) and the second was the coupled product at about 59% (Mn=520).

EXAMPLE 10

Preparation of 1,3-Bis(hexadecyloxy)-2-propanol using the Cascading Polyol Technique To a 500 milliliter round bottom flask equipped with an overhead stirrer, nitrogen inlet, reflux condenser, additional funnel, and temperature controller was charged 60.61 grams of hexadecanol (0.25 moles), 6.18 grams of tetraethylammonium iodide (0.024 moles), 1.44 grams of water (0.082 moles), 20.20 grams of potassium hydroxide (0.36 moles), and 125 grams of toluene. To a 100 milliliter addition funnel was charged 11.10 grams of epichlorohydrin (0.12 moles) and 25 grams of toluene. The solution was brought to 65° C. at which time the epichlorohydrin solution was added over a period of 15 minutes while maintaining a reaction temperature of 65° C.±5° C. The reaction was allowed to proceed for 48 hours.

After 48 hours, the solution was cooled down to room temperature. The toluene solution was washed with two 250 milliliter portions of deionized water. The aqueous layers were drained off, and the toluene was removed using a rotary evaporator. The final yield of product was 70.9 grams which is 109% of theory (residual is hexadecanol).

EXAMPLE 11

Sulfation of 1,3-Bis(nonylphenoxy)-2-propanol-block-(propylene oxide)$_{10}$-block-(ethylene oxide)$_{10}$ To a 250 milliliter round bottom flask equipped with an overhead stirrer, a temperature controller, and a vacuum adapter was added 75.0 grams of the material from Example 13 (49 mmoles). The kettle was then evacuated to <20 mmHg and heated to 100° C. to remove any water. After 1 hour, the kettle was cooled to 60° C. while under vacuum. When reaching 60° C., vacuum was broken with nitrogen and 5.3 grams of sulfamic acid (54 mmoles) was added. After charging the sulfamic acid, the kettle was heated to 110° C. and evacuated to <20 mmHg. The reaction was allowed to proceed for 3 hours.

At the end of the hold period, the kettle was cooled to 85° C. and vacuum was broken with nitrogen. 1.2 grams of diethanolamine (11 mmoles) was slowly added under a blanket of nitrogen. This solution was stirred for 30 minutes. 10 grams of ethanol was added to the kettle and the temperature was regulated to 55° C. This solution was stirred for 30 minutes. The heat was removed from the kettle and 30 grams of water along with 20 grams of ethanol were added while maintaining good agitation. The solution was stirred for 15 minutes or until cooled to room temperature (<35° C.).

The pH was checked by dissolving 2 grams of the product solution in 18 grams of deionized water. If the pH was below 6.5, 0.2 gram increments of diethanolamine was added until the pH is between 6.5 and 7.5.

EXAMPLE 12

Preparation of
1,3-Bis(nonylphenoxy)-2-propanol-block-(propylene oxide)$_{10}$

To a 500 milliliter stainless steel Zipperclave was added 100.0 grams (0.202 moles) of 1,3-bis(nonylphenoxy)-2-propanol prepared in Example 1 along with 0.7 grams of potassium hydroxide. The vessel was attached to an automated unit and was heated to 50° C. The vessel was continuously purged with nitrogen for 15 minutes and was then heated to 100° C. where it was again continuously purged with nitrogen for another 15 minutes. The vessel was then heated to 140° C. and is given a series of 6 purges by pressuring the vessel up to 80 psi, and then venting. Once the venting process was completed, the vessel was pressured to 20 psi with nitrogen.

Lines connected to a cylinder which had been precharged with 117.0 grams of propylene oxide (2.02 moles) were opened to the motor valves along with the main feed line on the Zipperclave. The feed was continued and the vessel pressure was regulated at 55 psi and a temperature of 140° C. The automation was designed to hold the temperature and the pressure within safe operating limits while addition of ethylene oxide proceeded through a pair of motor control valves. The feed was allowed to continue until all of the propylene oxide had been fed. After the feed was complete, the reaction was allowed to continue for 1 hour after which the vessel was cooled to 60° C., purged 4 times with nitrogen to 80 psi and was dumped to a container. The final product yield was 211 grams with a theoretical yield of 277 grams. The GPC molecular weight of the product was Mw=650 and the Mn=490 based on monodisperse polystyrene standards.

EXAMPLE 13

Preparation of
1,3-Bis(nonylphenoxy)-2-propanol-block-(propylene oxide)$_{10}$-block-(ethylene oxide)$_{10}$ To a 500 milliliter stainless steel Zipperclave was added 75.0 grams of the propoxylate prepared in Example 12 (0.070 moles) along with 0.3 grams of potassium hydroxide. The vessel was attached to an automated ethoxylation unit and was heated to 50° C. The vessel was continuously purged with nitrogen for 15 minutes and was then heated to 100° C. where it was again continuously purged with nitrogen for another 15 minutes. The vessel was then heated to 140° C. and was given a series of 6 purges by pressuring the vessel up to 80 psi, and then venting. Once the venting process was completed, the vessel was pressured to 20 psi with nitrogen.

The ethylene oxide lines were opened to the motor valves along with the main feed line on the Zipperclave. The feed was continued and the vessel pressure was regulated at 55 psi and a temperature of 140° C. The automation was designed to hold the temperature and the pressure within safe operating limits while addition of ethylene oxide proceeded through a pair of motor control valves. The feed was allowed to continue until 30.7 grams ethylene oxide (0.696 moles) was added based on a difference weight of the feed cylinder. After the feed was complete, the reaction is allowed to continue for 1 hour after which the vessel was cooled to 60° C., purged 4 times with nitrogen to 80 psi and was dumped to a container. The final product yield was 99 grams with a theoretical yield of 106 grams.

EXAMPLE 14

Preparation of Bis(nonylphenoxy) Adduct of
1,4-Butanediol Diglycidyl Ether

To a five neck, two liter round bottom flask equipped with an addition funnel, thermometer, nitrogen dispersant tube, mechanical stirrer, and a decanting head with a water-cooled condenser were added 506.8 grams (2.30 mole) of nonylphenol and 350 milliliters of cyclohexane. The solution was heated to reflux, and 6.5 grams (1.3 weight percent based on nonylphenol) of potassium hydroxide in 15 milliliters of water was slowly added to the round bottom flask. After all the water was recovered in the decanting head (15 milliliters+2 milliliters formed), 220 grams (1.09 mole) of 1,4-butanediol diglycidyl ether was added dropwise between 60 and 80° C. After the addition was complete, the solution was refluxed for four hours. The contents of the flask were then washed with a five percent aqueous solution of phosphoric acid, and the organic layer was separated from the water layer and washed twice with deionized water. The reaction mixture was then placed in a one liter round bottom flask, and the remaining cyclohexane and unreacted nonylphenol were recovered by distillation, first at atmospheric pressure, then under vacuum at 0.2 mm Hg. The kettle temperature was not allowed to exceed 180° C. during the distillation to prevent discoloration of the product. The concentrated solution was then refiltered to give 710 grams of a pale-yellow liquid. Molecular weight by end-group MW analysis was 689.9 (theoretical MW=643.0). Ir and nmr spectra were consistent with the expected structure of the product.

EXAMPLE 15

Preparation of 3 Mole Ethoxylate of
1,3-Bis(nonylphenoxy)-2-propanol

To a five hundred milliliter Zipperclave reactor were charged, under nitrogen, 200.1 grams (0.43 mole) of 1,3-bis(nonylphenoxy)-2-propanol prepared in Example 2 and 0.20 grams (0.1 weight percent) of BF$_3$.Et$_2$O. The reaction mixture was heated to 80° C., and 55.1 grams (1.25 mole) of ethylene oxide was fed to the reactor over a two hour period. After all the ethylene oxide was fed, the reaction mixture was allowed to cook out for one hour and then dumped hot, under nitrogen, into a jar containing 160 milliliters of a one percent aqueous solution of sodium hydroxide. The organic layer was separated from the water layer and washed twice with deionized water. The washes were performed at 90° C. to facilitate the separation of the two layers. The product was then dried by azeotropic removal of the water, using cyclohexane (300 milliliters) as the entrainer. The cyclohexane was stripped off under vacuum to give a pale-yellow liquid with a molecular weight by end-group MW analysis of 601.7 (theoretical MW=629). Ir and nmr spectra were consistent with the expected structure of the product.

EXAMPLE 16

Preparation of 8 Mole Ethoxylate of Bis(nonylphenoxy) Adduct of 1,4-Butanediol Diglycidyl Ether To a five hundred milliliter Zipperclave reactor were charged, under nitrogen, 150.2 grams (0.22 mole) of bis(nonylphenoxy) adduct of 1,4-butanediol diglycidyl ether prepared in Example 14 and 0.30 grams (0.2 weight percent) of $BF_3.Et_2O$. The reaction mixture was heated to 80° C., and 77.5 grams (1.76 mole) of ethylene oxide was fed to the reactor over a two hour period. After all the ethylene oxide was fed, the reaction mixture was allowed to cook out for one hour and then dumped hot, under nitrogen, into a jar containing 160 milliliters of a one percent aqueous solution of sodium hydroxide. The organic layer was separated from the water layer and washed twice with deionized water. The washes were performed at 90° C. to facilitate the separation of the two layers. The product was then dried by azeotropic removal of the water, using cyclohexane (300 milliliters) as the entrainer. The cyclohexane was stripped off under vacuum to give a pale-yellow liquid with a molecular weight by end-group MW analysis of 1047 (theoretical MW=995). Ir and nmr spectra were consistent with the expected structure of the product.

EXAMPLE 17

Preparation of Macromonomer Compound

Into a 1 liter round bottom reaction flask equipped with a heating mantle, dean stark trap, condenser, thermometer, nitrogen bubbler, nitrogen purge line and stirrer was charged 300 grams of toluene and 63 grams of a surfactant identified as S-1 in Table A below. With nitrogen purge, the resulting solution was heated to reflux at approximately 110° C. and azeotroped to remove trace water to dryness. The solution was subsequently cooled to 90° C., and 1.5 grams of bismuth hex chem 28% bismuth octoate catalyst (Mooney Chemical, Inc., Cleveland, Ohio) was charged and allowed to mix well, after which a stoichiometric amount of 95% m-TMI aliphatic isocyanate (American Cyanamid, Stamford, Conn.) was charged. After the reaction proceeded at 90° C. for 1.3 hours, the resulting product was cooled to 70° C. and 0.03 grams of 2,6-di-tert-4-methyl phenol (BHT) preservative was added. The mixture was poured into a stainless steel pan with large surface area to facilitate drying. The final product was a waxy material, and is designated herein as macromonomer M-1.

TABLE A

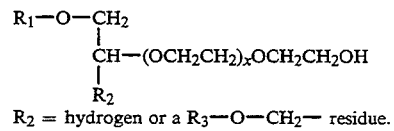

$R_2$ = hydrogen or a $R_3$—O—$CH_2$— residue.

| Surfactant | $R_1$ | $R_2/R_3$ | Moles of Ethoxylation |
|---|---|---|---|
| S-1 | Nonylphenol | Hydrogen ($R_2$) | 40 |
| S-2 | Nonylphenol | Nonylphenol ($R_3$) | 40 |
| S-3 | Nonylphenol | Nonylphenol ($R_3$) | 20 |
| S-4 | Nonylphenol | Octylphenol ($R_3$) | 20 |
| S-5 | Nonylphenol | Octylphenol ($R_3$) | 40 |
| S-6 | Nonylphenol | Nonylphenol ($R_3$) | 80 |
| S-7 | Nonylphenol | Nonylphenol ($R_3$) | 120 |

EXAMPLES 18–34

Preparation of Macromonomer Compounds

In a manner similar to that described in Example 17, other macromonomers were prepared using stoichiometric amounts of the surfactants and unsaturated compounds identified in Table B below,

TABLE B

| Example No. | Surfactant | Unsaturated Compound | Macromonomer Designation |
|---|---|---|---|
| 18 | S-2 | m-TMI | M-2 |
| 19 | S-3 | m-TMI | M-3 |
| 20 | S-4 | m-TMI | M-4 |
| 21 | S-5 | m-TMI | M-5 |
| 22 | S-6 | m-TMI | M-6 |
| 23 | S-7 | m-TMI | M-7 |
| 24 | S-2 | Isocyanato Ethyl Methacrylate | M-8 |
| 25 | S-5 | Isocyanato Ethyl Methacrylate | M-9 |
| 26 | S-1 | Methacrylic Anhydride | M-10 |
| 27 | S-2 | Methacrylic Anhydride | M-11 |
| 28 | S-5 | Methacrylic Anhydride | M-12 |
| 29 | S-6 | Methacrylic Anhydride | M-13 |
| 30 | S-2 | Acrylic Anhydride | M-14 |
| 31 | S-5 | Acrylic Anhydride | M-15 |
| 32 | S-6 | Acrylic Anhydride | M-16 |
| 33 | S-2 | Crotonic Anhydride | M-17 |
| 34 | S-5 | Maleic Anhydride | M-18 |

EXAMPLE 35

Preparation of Alkali Soluble Thickener

A monomer mixture (300 grams) was prepared by charging ethyl acrylate (Aldrich), methacrylic acid (Aldrich), macromonomer M-1, 13 grams of a 75% solution of Aerosol ® OT surfactant (American Cyanamid, Stamford, Conn.), and 3 grams of distilled deionized water to a bottle, and dispersing the contents with vigorous shaking. The ethyl acrylate, methacrylic acid and macromonomer M-1 were added in amounts identified in Table C below. A catalyst feed mixture comprised of 0.53 grams of sodium persulfate (Aldrich) and 52.47 grams of water was prepared in another container. To a 2 liter resin flask that had been immersed in a thermostated water bath and equipped with a 4-bladed stainless steel mechanical stirrer, Claisen connecting tube, water condenser, nitrogen sparge and bubble trap, thermometer and monomer and catalyst addition inlets, 1.20 grams of the sodium salt of vinyl sulfonic acid and 658.5 grams of water were charged. The monomer mixture was charged to a 1-liter graduated monomer feed cylinder, and the catalyst solution was charged to a 125 milliliter graduated catalyst feed cylinder. Under nitrogen purge, the reactor was heated to 70° C., whereupon 33 milliliters of the monomer mixture and 3 milliliters of the catalyst feed mixture were charged to the reaction vessel. The reaction vessel was subsequently heated to 80° C. After allowing the monomers to react for 20 minutes to form a seed product, the monomer and catalyst feed mixtures were conveyed to the reaction vessel by FMI pumps via ⅛" teflon tubing at a rate of 1.94 and 0.27 milliliters/minute, respectively, under continuous stirring at a reaction temperature held between 76°–82° C. The reaction was allowed to proceed for another hour, after which the product was cooled and filtered with a 200 mesh nylon cloth. The coagulum was collected from the reaction vessel and filter cloth. Thickening ability of the resulting product was monitored by Brookfield viscosity at 6 rpm by diluting the latex to 0.25%, 0.50% and 0.75% solids, and subsequently neutralizing the product to pH=9.0 with a 95% solution of 2-amino-2-methyl-1-propanol (AMP-95, Angus Chemical Company). The results are given in Table C.

EXAMPLES 36–131
Preparation of Alkali Soluble Thickeners

In a manner similar to that described in Example 35, other alkali soluble thickeners were prepared using the monomers identified in Tables C–J below in the amounts identified in Tables C–J. Table C illustrates the influence of m-TMI-containing macromonomer concentration and ethoxylation on thickening efficiency. Table D illustrates the influence of mixing m-TMI-containing macromonomers of various ethoxylations on thickening efficiency. Table E illustrates the influence of unsaturation type of urethane-containing macromonomers on thickening efficiency. Table F illustrates the influence of macromonomer ester structure and ethoxylation on thickening efficiency. Table G illustrates the influence of acid type and concentration on thickening efficiency. Table H illustrates the influence of polymer glass transition temperature and water solubility on thickening efficiency. Table I illustrates the influence of cross-linkable monomer concentration on thickening efficiency. Table J illustrates the influence of mercaptan on thickening efficiency. As used in Tables C–J below, the following abbreviations have the indicated meanings: MM=Macromonomer; EA=Ethyl Acrylate; MAA=Methacrylic Acid; AA=Acrylic Acid; MA=-Methyl Acrylate; t-BA=t-Butyl Acrylate; n-BA=n-Butyl Acrylate; MMA=Methyl Methacrylate; 2-EHP=2-Ethylhexyl Propionate Mercaptan; and 2-HEA=2-Hydroxy Ethyl Acrylate.

TABLE C

| Example | Macromonomer | Thickener Composition by Weight | | | Brookfield Viscosity (CPS) @ pH = 9.0 | | | Thickener Designation |
|---|---|---|---|---|---|---|---|---|
| | | % MM | % EA | % MAA | 0.25% | 0.50% | 0.75% | |
| 35 | M-1 | 10 | 50 | 40 | 90 | 380 | 1,000 | P-1 |
| 36 | M-2 | 5 | 55 | 40 | 270 | 11,400 | 103,600 | P-2 |
| 37 | M-2 | 10 | 50 | 40 | 120 | 3,100 | 60,000 | P-3 |
| 38 | M-2 | 10 | 50 | 40 | 105 | 10,400 | 130,000 | P-3a |
| 39 | M-2 | 20 | 40 | 40 | 25 | 2,150 | 50,500 | P-4 |
| 40 | M-2 | 30 | 30 | 40 | 10 | 790 | 20,000 | P-5 |
| 41 | M-3 | 5 | 55 | 40 | 390 | 2,260 | 17,900 | P-6 |
| 42 | M-3 | 6.5 | 53.5 | 40 | 142 | 1,200 | 18,500 | P-7 |
| 43 | M-3 | 10 | 50 | 40 | 220 | 3,050 | 40,000 | P-8 |
| 44 | M-3 | 20 | 40 | 40 | 75 | 2,350 | 27,500 | P-9 |
| 45 | M-4 | 10 | 50 | 40 | 242 | 4,400 | 39,000 | P-10 |
| 46 | M-5 | 10 | 50 | 40 | 45 | 7,400 | 84,000 | P-11 |
| 47 | M-5 | 20 | 40 | 40 | 34 | 4,450 | 59,000 | P-12 |
| 48 | M-6 | 5 | 55 | 40 | 460 | 25,500 | 88,000 | P-13 |
| 49 | M-6 | 10 | 50 | 40 | 105 | 39,000 | 150,000 | P-14 |
| 50 | M-6 | 15 | 45 | 40 | 195 | 43,000 | 140,000 | P-15 |
| 51 | M-6 | 20 | 40 | 40 | 125 | 52,500 | 187,000 | P-16 |
| 52 | M-6 | 30 | 30 | 40 | 315 | 56,500 | 162,000 | P-17 |
| 53 | M-7 | 5 | 55 | 40 | 230 | 7,800 | 15,800 | P-18 |
| 54 | M-7 | 10 | 50 | 40 | 900 | 17,400 | 35,000 | P-19 |

TABLE D

| Example | Macromonomer | Thickener Composition by Weight | | | Brookfield Viscosity (CPS) @ pH = 9.0 | | | Thickener Designation |
|---|---|---|---|---|---|---|---|---|
| | | % MM | % EA | % MAA | 0.25% | 0.50% | 0.75% | |
| 55 | M-3:M-6 1:1 | 10 | 50 | 40 | 225 | 24,000 | 85,000 | P-20 |
| 56 | M-2:M-6 1:1 | 10 | 50 | 40 | 135 | 21,200 | 134,000 | P-21 |

TABLE E

| Example | Macromonomer | Thickener Composition by Weight | | | Brookfield Viscosity (CPS) @ pH = 9.0 | | | Thickener Designation |
|---|---|---|---|---|---|---|---|---|
| | | % MM | % EA | % MAA | 0.25% | 0.50% | 0.75% | |
| 57 | M-8 | 5 | 55 | 40 | 250 | 14,800 | 124,000 | P-22 |
| 58 | M-8 | 10 | 50 | 40 | 93 | 11,200 | 125,400 | P-23 |
| 59 | M-8 | 20 | 40 | 40 | 45 | 6,140 | 84,500 | P-24 |
| 60 | M-9 | 5 | 55 | 40 | 275 | 6,200 | 57,000 | P-25 |
| 61 | M-9 | 10 | 50 | 40 | 250 | 10,100 | 80,000 | P-26 |
| 62 | M-9 | 20 | 40 | 40 | 90 | 7,800 | 90,000 | P-27 |

TABLE E-continued

| Example | Macromonomer | Thickener Composition by Weight | | | Brookfield Viscosity (CPS) @ pH = 9.0 | | | Thickener Designation |
|---|---|---|---|---|---|---|---|---|
| | | % MM | % EA | % MAA | 0.25% | 0.50% | 0.75% | |
| 63 | M-9 | 30 | 30 | 40 | 45 | 5,200 | 69,000 | P-28 |

TABLE F

| Example | Macromonomer | Thickener Composition by Weight | | | Brookfield Viscosity (CPS) @ pH = 9.0 | | | Thickener Designation |
|---|---|---|---|---|---|---|---|---|
| | | % MM | % EA | % MAA | 0.25% | 0.50% | 0.75% | |
| 64 | M-10 | 10 | 50 | 40 | 130 | 285 | 410 | P-29 |
| 65 | M-11 | 10 | 50 | 40 | 190 | 19,500 | 152,000 | P-30 |
| 66 | M-11 | 20 | 40 | 40 | 120 | 13,500 | 146,000 | P-31 |
| 67 | M-11 | 30 | 30 | 40 | 96 | 8,000 | 73,000 | P-32 |
| 68 | M-12 | 5 | 55 | 40 | 260 | 5,400 | 51,000 | P-33 |
| 69 | M-12 | 10 | 50 | 40 | 175 | 9,200 | 71,000 | P-34 |
| 70 | M-12 | 20 | 40 | 40 | 100 | 7,400 | 77,000 | P-35 |
| 71 | M-12 | 30 | 30 | 40 | 62 | 4,500 | 63,000 | P-36 |
| 72 | M-13 | 5 | 55 | 40 | 320 | 25,600 | 79,000 | P-37 |
| 73 | M-13 | 10 | 50 | 40 | 97 | 28,000 | 125,000 | P-38 |
| 74 | M-13 | 20 | 40 | 40 | 300 | 58,200 | 171,000 | P-39 |
| 75 | M-13 | 30 | 30 | 40 | 730 | 63,000 | 163,000 | P-40 |
| 76 | M-14 | 10 | 50 | 40 | 410 | 22,700 | 130,000 | P-41 |
| 77 | M-14 | 20 | 40 | 40 | 1225 | 44,500 | 168,000 | P-42 |
| 78 | M-14 | 30 | 30 | 40 | 1010 | 42,500 | 180,000 | P-43 |
| 79 | M-15 | 5 | 55 | 40 | 84 | 1,680 | 29,000 | P-44 |
| 80 | M-15 | 10 | 50 | 40 | 350 | 12,000 | 83,000 | P-45 |
| 81 | M-15 | 20 | 40 | 40 | 220 | 24,500 | 122,000 | P-46 |
| 82 | M-15 | 30 | 30 | 40 | 1050 | 33,000 | 133,000 | P-47 |
| 83 | M-16 | 5 | 55 | 40 | 450 | 17,720 | 45,300 | P-48 |
| 84 | M-16 | 10 | 50 | 40 | 1,345 | 27,000 | 98,000 | P-49 |
| 85 | M-16 | 20 | 40 | 40 | 3,450 | 65,800 | 158,000 | P-50 |
| 86 | M-16 | 30 | 30 | 40 | 11,600 | 81,000 | 157,000 | P-51 |
| 87 | M-17 | 10 | 50 | 40 | 410 | 12,000 | 60,000 | P-52 |
| 88 | M-17 | 20 | 40 | 40 | 255 | 10,600 | 46,300 | P-53 |
| 89 | M-17 | 30 | 30 | 40 | 38 | 2,525 | 13,500 | P-54 |
| 90 | M-18 | 5 | 55 | 40 | 100 | 810 | 3,500 | P-55 |
| 91 | M-18 | 10 | 50 | 40 | 110 | 1,420 | 5,940 | P-56 |
| 92 | M-18 | 20 | 40 | 40 | 30 | 870 | 2,425 | P-57 |

TABLE G

| Example | Macromonomer | Thickener Composition by Weight | | | | Brookfield Viscosity (CPS) @ pH = 9.0 | | | Thickener Designation |
|---|---|---|---|---|---|---|---|---|---|
| | | % MM | % EA | % MAA | % AA | 0.25% | 0.50% | 0.75% | |
| 93 | M-2 | 10 | 60 | 30 | 0 | 1520 | 12,200 | 102,000 | P-58 |
| 94 | M-2 | 10 | 70 | 20 | 0 | 45 | 3,800 | 50,000 | P-59 |
| 95 | M-2 | 10 | 80 | 10 | 0 | <10 | <10 | <10 | P-60 |
| 96 | M-2 | 10 | 60 | 0 | 30 | <10 | 95 | 6,800 | P-61 |
| 97 | M-6 | 20 | 60 | 20 | 0 | 15 | 13,500 | 43,500 | P-62 |
| 98 | M-6 | 5 | 65 | 30 | 0 | 210 | 13,000 | 56,500 | P-63 |
| 99 | M-6 | 10 | 60 | 30 | 0 | 77 | 24,000 | 88,000 | P-64 |
| 100 | M-6 | 20 | 50 | 30 | 0 | 17 | 7,600 | 79,000 | P-65 |
| 101 | M-6 | 5 | 45 | 50 | 0 | 130 | 7,060 | 28,000 | P-66 |
| 102 | M-6 | 10 | 40 | 50 | 0 | 86 | 16,700 | 52,500 | P-67 |
| 103 | M-6 | 20 | 30 | 50 | 0 | 130 | 28,000 | 122,000 | P-68 |
| 104 | M-11 | 10 | 70 | 0 | 20 | <10 | 213 | 7300 | P-69 |
| 105 | M-17 | 10 | 50 | 20 | 20 | 710 | 16,500 | 66,000 | P-70 |

TABLE H

| Example | Macromonomer | Thickener Composition by Weight | | | | Brookfield Viscosity (CPS) @ pH = 9.0 | | | Thickener Designation |
|---|---|---|---|---|---|---|---|---|---|
| | | % MM | % EA | % MAA | % Other | 0.25% | 0.50% | 0.75% | |
| 106 | M-2 | 10 | 40 | 40 | 10 MMA | 90 | 5,760 | 82,000 | P-71 |
| 107 | M-2 | 10 | 30 | 40 | 20 MMA | 15 | 1,125 | 55,000 | P-72 |
| 108 | M-2 | 10 | 20 | 40 | 30 MMA | 10 | 207 | 6,000 | P-73 |
| 109 | M-2 | 10 | 0 | 40 | 50 MMA | <10 | <10 | <10 | P-74 |
| 110 | M-2 | 10 | 30 | 40 | 20 styrene | 20 | 310 | 1,330 | P-75 |
| 111 | M-2 | 10 | 40 | 40 | 10 styrene | 95 | 7,540 | 75,500 | P-76 |

TABLE H-continued

| Example | Macromonomer | Thickener Composition by Weight % MM | % EA | % MAA | % Other | Brookfield Viscosity (CPS) @ pH = 9.0 0.25% | 0.50% | 0.75% | Thickener Designation |
|---|---|---|---|---|---|---|---|---|---|
| 112 | M-2 | 10 | 40 | 40 | 10 n-BA | 220 | 13,800 | 118,000 | P-77 |
| 113 | M-2 | 10 | 30 | 40 | 20 n-BA | 185 | 7,400 | 66,500 | P-78 |
| 114 | M-2 | 10 | 40 | 40 | 10 t-BA | 130 | 10,100 | 100,000 | P-79 |
| 115 | M-2 | 10 | 30 | 40 | 20 t-BA | 125 | 7,200 | 77,500 | P-80 |
| 116 | M-2 | 10 | 40 | 40 | 10 MA | 100 | 6,900 | 121,000 | P-81 |
| 117 | M-2 | 10 | 30 | 40 | 20 MA | 73 | 5,000 | 90,000 | P-82 |
| 118 | M-6 | 20 | 30 | 40 | 10 MMA | 33 | 15,400 | 150,000 | P-83 |

TABLE I

| Example | Macromonomer | Thickener Composition by Weight % MM | % EA | % MAA | % 2-HEA | Brookfield Viscosity (CPS) @ pH = 9.0 0.25% | 0.50% | 0.75% | Thickener Designation |
|---|---|---|---|---|---|---|---|---|---|
| 119 | M-2 | 10 | 47.7 | 40 | 2.3 | 97 | 9,060 | 127,000 | P-84 |
| 120 | M-2 | 10 | 57.7 | 30 | 2.3 | 62 | 6,300 | 76,000 | P-85 |
| 121 | M-2 | 20 | 37.5 | 40 | 2.5 | 27 | 6,200 | 116,600 | P-86 |
| 122 | M-2 | 20 | 35 | 40 | 5 | <10 | 260 | 18,600 | P-87 |
| 123 | M-2 | 20 | 32.5 | 40 | 7.5 | 20 | 720 | 40,000 | P-88 |
| 124 | M-2 | 20 | 30 | 40 | 10 | 10 | 520 | 29,500 | P-89 |

TABLE J

| Example | Macromonomer | Thickener Composition by Weight % MM | % EA | % MAA | % 2-HEP* | Brookfield Viscosity (CPS) @ pH = 9.0 0.25% | 0.50% | 0.75% | Thickener Designation |
|---|---|---|---|---|---|---|---|---|---|
| 125 | M-2 | 10 | 40 | 50 | .05 | 165 | 22,800 | 142,000 | P-90 |
| 126 | M-2 | 10 | 50 | 40 | 0.2 | 18 | 2,060 | 66,500 | P-91 |
| 127 | M-2 | 10 | 50 | 40 | 0.3 | <10 | 115 | 9,700 | P-92 |
| 128 | M-2 | 10 | 50 | 40 | 0.5 | <10 | 12 | 355 | P-93 |
| 129 | M-2 | 10 | 50 | 40 | 1 | <10 | <10 | <10 | P-94 |
| 130 | M-6 | 10 | 50 | 40 | .05 | 230 | 23,700 | 90,700 | P-95 |
| 131 | M-6 | 10 | 50 | 40 | .2 | 30 | 5,170 | 33,000 | P-96 |

*% charged to reactor based on monomer.

EXAMPLES 132-187

Co-Thickening with Surfactants

The addition of certain surfactants to an associative polymer solution produces a co-thickening effect. The results in Table L below show the co-thickening effect produced by the addition with thorough mixing of certain surfactants identified in Table K below in the amounts identified in Table L to a 0.5% alkaline solution of an alkali soluble thickener identified in Table L as measured with a Brookfield Viscometer at 6 rpm at pH=9.0.

TABLE K $$R_1-O-CH_2$$
$$\quad\quad |$$
$$\quad\quad CH-(OCH_2CH_2)_xOCH_2CH_2OH$$
$$\quad\quad |$$
$$\quad\quad R_2$$

$R_2$ = hydrogen or a $R_3-O-CH_2-$ residue.

| Surfactant | $R_1$ | $R_2/R_3$ | Moles of Ethoxylation |
|---|---|---|---|
| S-8 | Nonylphenol | Nonylphenol ($R_3$) | 20 |
| S-9 | Nonylphenol | Nonylphenol ($R_3$) | 40 |
| S-10 | Nonylphenol | Nonylphenol ($R_3$) | 80 |
| S-11 | Nonylphenol | Hydrogen ($R_2$) | 25 |
| S-12 | Nonylphenol | Hydrogen ($R_2$) | 40 |
| S-13 | Nonylphenol | Octylphenol ($R_3$) | 20 |

TABLE K-continued $$R_1-O-CH_2$$
$$\quad\quad |$$
$$\quad\quad CH-(OCH_2CH_2)_xOCH_2CH_2OH$$
$$\quad\quad |$$
$$\quad\quad R_2$$

$R_2$ = hydrogen or a $R_3-O-CH_2-$ residue.

| Surfactant | $R_1$ | $R_2/R_3$ | Moles of Ethoxylation |
|---|---|---|---|
| S-14 | Nonylphenol | Octylphenol ($R_3$) | 40 |
| S-15* | Nonylphenol | Nonylphenol ($R_3$) | 40 |
| S-16 | Octylphenol | Hydrogen ($R_2$) | 25 |

*Sulfated derivative.

TABLE L

| Example | Surfactant | Surfactant Concentration (wt. %) | Thickener | Brookfield Viscosity (cps) @ pH = 9.0 |
|---|---|---|---|---|
| 132 | S-8 | 0.0 | P-3 | 3100 |
|  | S-8 | 0.2 | P-3 | 32700 |
|  | S-8 | 0.4 | P-3 | 45700 |
|  | S-8 | 0.8 | P-3 | 63300 |
|  | S-8 | 1.0 | P-3 | 65500 |
|  | S-8 | 2.0 | P-3 | >100000 |
| 133 | S-9 | 0.2 | P-3 | 24200 |
|  | S-9 | 0.4 | P-3 | 18700 |
|  | S-9 | 0.8 | P-3 | 6600 |
|  | S-9 | 1.0 | P-3 | 4060 |

TABLE L-continued

| Example | Surfactant | Surfactant Concentration (wt. %) | Thickener | Brookfield Viscosity (cps) @ pH = 9.0 |
|---|---|---|---|---|
| | | 2.0 | P-3 | 1225 |
| 134 | S-10 | 0.2 | P-3 | 20600 |
| | S-10 | 0.4 | P-3 | 17300 |
| | S-10 | 0.8 | P-3 | 8500 |
| | S-10 | 1.0 | P-3 | 6300 |
| | S-10 | 2.0 | P-3 | 1850 |
| 135 | S-11 | 0.2 | P-3 | 12000 |
| | S-11 | 0.4 | P-3 | 3160 |
| | S-11 | 0.8 | P-3 | 700 |
| | S-11 | 1.0 | P-3 | 485 |
| | S-11 | 2.0 | P-3 | 480 |
| 136 | S-12 | 0.2 | P-3 | 9200 |
| | S-12 | 0.4 | P-3 | 4500 |
| | S-12 | 0.8 | P-3 | 1000 |
| | S-12 | 1.0 | P-3 | 875 |
| | S-12 | 2.0 | P-3 | 565 |
| 137 | S-13 | 0.2 | P-3 | 34300 |
| | S-13 | 0.4 | P-3 | 26700 |
| | S-13 | 0.8 | P-3 | 11500 |
| | S-13 | 1.0 | P-3 | 8600 |
| | S-13 | 2.0 | P-3 | 2450 |
| 138 | S-14 | 0.2 | P-3 | 22200 |
| | S-14 | 0.4 | P-3 | 17200 |
| | S-14 | 0.8 | P-3 | 6900 |
| | S-14 | 1.0 | P-3 | 4500 |
| | S-14 | 2.0 | P-3 | 1500 |
| 139 | S-15 | 0.2 | P-3 | 10500 |
| | S-15 | 0.4 | P-3 | 4940 |
| | S-15 | 0.8 | P-3 | 2160 |
| | S-15 | 1.0 | P-3 | 1450 |
| | S-15 | 2.0 | P-3 | 355 |
| 140 | S-16 | 0.2 | P-3 | 14300 |
| | S-16 | 0.4 | P-3 | 4080 |
| | S-16 | 0.8 | P-3 | 1075 |
| | S-16 | 1.0 | P-3 | 735 |
| | S-16 | 2.0 | P-3 | 485 |
| 141 | S-8 | 0.0 | P-2 | 11400 |
| | S-8 | 0.2 | P-2 | 23500 |
| | S-8 | 0.4 | P-2 | 34000 |
| | S-8 | 0.8 | P-2 | 64000 |
| | S-8 | 1.0 | P-2 | 71000 |
| | S-8 | 2.0 | P-2 | 93000 |
| 142 | S-9 | 0.2 | P-2 | 11000 |
| | S-9 | 0.4 | P-2 | 4000 |
| | S-9 | 0.8 | P-2 | 2000 |
| | S-9 | 1.0 | P-2 | 1400 |
| | S-9 | 2.0 | P-2 | 850 |
| 143 | S-10 | 0.2 | P-2 | 10500 |
| | S-10 | 0.4 | P-2 | 5000 |
| | S-10 | 0.8 | P-2 | 2000 |
| | S-10 | 1.0 | P-2 | 1600 |
| | S-10 | 2.0 | P-2 | 950 |
| 144 | S-11 | 0.2 | P-2 | 2700 |
| | S-11 | 0.4 | P-2 | 1000 |
| | S-11 | 0.8 | P-2 | 800 |
| | S-11 | 1.0 | P-2 | 660 |
| | S-11 | 2.0 | P-2 | 620 |
| 145 | S-12 | 0.2 | P-2 | 2800 |
| | S-12 | 0.4 | P-2 | 1000 |
| | S-12 | 0.8 | P-2 | 850 |
| | S-12 | 1.0 | P-2 | 660 |
| | S-12 | 2.0 | P-2 | 650 |
| 146 | S-8 | 0.0 | P-4 | 2150 |
| | S-8 | 0.2 | P-4 | 19000 |
| | S-8 | 0.4 | P-4 | 31000 |
| | S-8 | 0.8 | P-4 | 55000 |
| | S-8 | 1.0 | P-4 | 61000 |
| | S-8 | 2.0 | P-4 | 85000 |
| 147 | S-9 | 0.2 | P-4 | 19500 |
| | S-9 | 0.4 | P-4 | 21500 |
| | S-9 | 0.8 | P-4 | 11500 |
| | S-9 | 1.0 | P-4 | 7400 |
| | S-9 | 2.0 | P-4 | 2250 |
| 148 | S-10 | 0.2 | P-4 | 12600 |
| | S-10 | 0.4 | P-4 | 17400 |
| | S-10 | 0.8 | P-4 | 12600 |
| | S-10 | 1.0 | P-4 | 6600 |
| | S-10 | 2.0 | P-4 | 2600 |
| 149 | S-11 | 0.2 | P-4 | 17400 |
| | S-11 | 0.4 | P-4 | 7800 |
| | S-11 | 0.8 | P-4 | 1650 |
| | S-11 | 1.0 | P-4 | 860 |
| | S-11 | 2.0 | P-4 | 560 |
| 150 | S-12 | 0.2 | P-4 | 14600 |
| | S-12 | 0.4 | P-4 | 7800 |
| | S-12 | 0.8 | P-4 | 1500 |
| | S-12 | 1.0 | P-4 | 960 |
| | S-12 | 2.0 | P-4 | 450 |
| 151 | S-8 | 0.0 | P-5 | 790 |
| | S-8 | 0.2 | P-5 | 4600 |
| | S-8 | 0.4 | P-5 | 19600 |
| | S-8 | 0.8 | P-5 | 42000 |
| | S-8 | 1.0 | P-5 | 50000 |
| | S-8 | 2.0 | P-5 | 90000 |
| 152 | S-9 | 0.2 | P-5 | 5800 |
| | S-9 | 0.4 | P-5 | 13200 |
| | S-9 | 0.8 | P-5 | 9200 |
| | S-9 | 1.0 | P-5 | 5200 |
| | S-9 | 2.0 | P-5 | 1600 |
| 153 | S-10 | 0.2 | P-5 | 4050 |
| | S-10 | 0.4 | P-5 | 10400 |
| | S-10 | 0.8 | P-5 | 9400 |
| | S-10 | 1.0 | P-5 | 5000 |
| | S-10 | 2.0 | P-5 | 1600 |
| 154 | S-11 | 0.2 | P-5 | 10600 |
| | S-11 | 0.4 | P-5 | 4200 |
| | S-11 | 0.8 | P-5 | 1400 |
| | S-11 | 1.0 | P-5 | 970 |
| | S-11 | 2.0 | P-5 | 410 |
| 155 | S-12 | 0.2 | P-5 | 6000 |
| | S-12 | 0.4 | P-5 | 4200 |
| | S-12 | 0.8 | P-5 | 1150 |
| | S-12 | 1.0 | P-5 | 600 |
| | S-12 | 2.0 | P-5 | 340 |
| 156 | S-8 | 0 | P-7 | 1200 |
| | S-8 | 0.2 | P-7 | 9000 |
| | S-8 | 0.4 | P-7 | 21000 |
| | S-8 | 0.8 | P-7 | 37000 |
| | S-8 | 1.0 | P-7 | 49000 |
| | S-8 | 2.0 | P-7 | 78000 |
| 157 | S-9 | 0.2 | P-7 | 1600 |
| | S-9 | 0.4 | P-7 | 1350 |
| | S-9 | 0.8 | P-7 | 900 |
| | S-9 | 1.0 | P-7 | 762 |
| | S-9 | 2.0 | P-7 | 565 |
| 158 | S-10 | 0.2 | P-7 | 1100 |
| | S-10 | 0.4 | P-7 | 1150 |
| | S-10 | 0.8 | P-7 | 900 |
| | S-10 | 1.0 | P-7 | 823 |
| | S-10 | 2.0 | P-7 | 650 |
| 159 | S-11 | 0.2 | P-7 | 1175 |
| | S-11 | 0.4 | P-7 | 685 |
| | S-11 | 0.8 | P-7 | 503 |
| | S-11 | 1.0 | P-7 | 495 |
| | S-11 | 2.0 | P-7 | 502 |
| 160 | S-12 | 0.2 | P-7 | 950 |
| | S-12 | 0.4 | P-7 | 675 |
| | S-12 | 0.8 | P-7 | 525 |
| | S-12 | 1.0 | P-7 | 500 |
| | S-12 | 2.0 | P-7 | 480 |
| 161 | S-8 | 0.0 | P-13 | 25500 |
| | S-8 | 0.2 | P-13 | 31500 |
| | S-8 | 0.4 | P-13 | 46500 |
| | S-8 | 0.8 | P-13 | 60000 |
| | S-8 | 1.0 | P-13 | 60000 |
| | S-8 | 2.0 | P-13 | 62500 |
| 162 | S-9 | 0.2 | P-13 | 8640 |
| | S-9 | 0.4 | P-13 | 2940 |
| | S-9 | 0.8 | P-13 | 1200 |
| | S-9 | 1.0 | P-13 | 1000 |
| | S-9 | 2.0 | P-13 | 750 |
| 163 | S-10 | 0.2 | P-13 | 10100 |
| | S-10 | 0.4 | P-13 | 4200 |
| | S-10 | 0.8 | P-13 | 1450 |
| | S-10 | 1.0 | P-13 | 1300 |
| | S-10 | 2.0 | P-13 | 900 |
| 164 | S-12 | 0.2 | P-13 | 2540 |
| | S-12 | 0.4 | P-13 | 1125 |

TABLE L-continued

| Example | Surfactant | Surfactant Concentration (wt. %) | Thickener | Brookfield Viscosity (cps) @ pH = 9.0 |
|---|---|---|---|---|
| | S-12 | 0.8 | P-13 | 750 |
| | S-12 | 1.0 | P-13 | 670 |
| | S-12 | 2.0 | P-13 | 610 |
| 165 | S-8 | 0.0 | P-14 | 39000 |
| | S-8 | 0.2 | P-14 | 61000 |
| | S-8 | 0.4 | P-14 | 73500 |
| | S-8 | 0.8 | P-14 | 87000 |
| | S-8 | 1.0 | P-14 | 93500 |
| | S-8 | 2.0 | P-14 | 122000 |
| 166 | S-9 | 0.2 | P-14 | 41000 |
| | S-9 | 0.4 | P-14 | 13700 |
| | S-9 | 0.8 | P-14 | 6200 |
| | S-9 | 1.0 | P-14 | 3500 |
| | S-9 | 2.0 | P-14 | 1200 |
| 167 | S-10 | 0.2 | P-14 | 38200 |
| | S-10 | 0.4 | P-14 | 20500 |
| | S-10 | 0.8 | P-14 | 7300 |
| | S-10 | 1.0 | P-14 | 5400 |
| | S-10 | 2.0 | P-14 | 1950 |
| 168 | S-12 | 0.2 | P-14 | 13000 |
| | S-12 | 0.4 | P-14 | 4300 |
| | S-12 | 0.8 | P-14 | 975 |
| | S-12 | 1.0 | P-14 | 950 |
| | S-12 | 2.0 | P-14 | 660 |
| 169 | S-8 | 0.0 | P-16 | 52500 |
| | S-8 | 0.2 | P-16 | 95000 |
| | S-8 | 0.4 | P-16 | 92000 |
| | S-8 | 0.8 | P-16 | 122000 |
| | S-8 | 1.0 | P-16 | 125000 |
| | S-8 | 2.0 | P-16 | 138000 |
| 170 | PS-9 | 0.2 | P-16 | 73500 |
| | PS-9 | 0.4 | P-16 | 53000 |
| | PS-9 | 0.8 | P-16 | 25000 |
| | PS-9 | 1.0 | P-16 | 21000 |
| | PS-9 | 2.0 | P-16 | 5400 |
| 171 | S-10 | 0.2 | P-16 | 52800 |
| | S-10 | 0.4 | P-16 | 34500 |
| | S-10 | 0.8 | P-16 | 5400 |
| | S-10 | 1.0 | P-16 | 2925 |
| | S-10 | 2.0 | P-16 | 775 |
| 172 | S-13 | 0.2 | P-16 | 45800 |
| | S-13 | 0.4 | P-16 | 54000 |
| | S-13 | 0.8 | P-16 | 50800 |
| | S-13 | 1.0 | P-16 | 54500 |
| | S-13 | 2.0 | P-16 | 63000 |
| 173 | S-14 | 0.2 | P-16 | 22700 |
| | S-14 | 0.4 | P-16 | 2480 |
| | S-14 | 0.8 | P-16 | 710 |
| | S-14 | 1.0 | P-16 | 532 |
| | S-14 | 2.0 | P-16 | 415 |
| 174 | S-8 | 0.0 | P-29 | 285 |
| | S-8 | 0.2 | P-29 | 285 |
| | S-8 | 0.4 | P-29 | 360 |
| | S-8 | 0.8 | P-29 | 477 |
| | S-8 | 1.0 | P-29 | 505 |
| | S-8 | 2.0 | P-29 | 837 |
| 175 | S-9 | 0.2 | P-29 | 282 |
| | S-9 | 0.4 | P-29 | 285 |
| | S-9 | 0.8 | P-29 | 284 |
| | S-9 | 1.0 | P-29 | 298 |
| | S-9 | 2.0 | P-29 | 322 |
| 176 | S-10 | 0.2 | P-29 | 272 |
| | S-10 | 0.4 | P-29 | 278 |
| | S-10 | 0.8 | P-29 | 285 |
| | S-10 | 1.0 | P-29 | 297 |
| | S-10 | 2.0 | P-29 | 315 |
| 177 | S-12 | 0.2 | P-29 | 267 |
| | S-12 | 0.4 | P-29 | 279 |
| | S-12 | 0.8 | P-29 | 298 |
| | S-12 | 1.0 | P-29 | 311 |
| | S-12 | 2.0 | P-29 | 320 |
| 178 | S-8 | 0.0 | P-30 | 19500 |
| | S-8 | 0.2 | P-30 | 79000 |
| | S-8 | 0.4 | P-30 | 71200 |
| | S-8 | 0.8 | P-30 | 81000 |
| | S-8 | 1.0 | P-30 | 89500 |
| | S-8 | 2.0 | P-30 | 175000 |
| 179 | S-9 | 0.2 | P-30 | 52000 |
| | S-9 | 0.4 | P-30 | 35500 |
| | S-9 | 0.8 | P-30 | 16500 |
| | S-9 | 1.0 | P-30 | 15600 |
| | S-9 | 2.0 | P-30 | 5620 |
| 180 | S-10 | 0.2 | P-30 | 47200 |
| | S-10 | 0.4 | P-30 | 26300 |
| | S-10 | 0.8 | P-30 | 20300 |
| | S-10 | 1.0 | P-30 | 13400 |
| | S-10 | 2.0 | P-30 | 4700 |
| 181 | S-12 | 0.2 | P-30 | 23000 |
| | S-12 | 0.4 | P-30 | 6840 |
| | S-12 | 0.8 | P-30 | 3125 |
| | S-12 | 1.0 | P-30 | 1750 |
| | S-12 | 2.0 | P-30 | 1225 |
| 182 | S-8 | 0.0 | P-46 | 24500 |
| | S-8 | 0.2 | P-46 | 79000 |
| | S-8 | 0.4 | P-46 | 75000 |
| | S-8 | 0.8 | P-46 | 86000 |
| | S-8 | 1.0 | P-46 | 95000 |
| | S-8 | 2.0 | P-46 | 150000 |
| 183 | S-9 | 0.2 | P-46 | 40500 |
| | S-9 | 0.4 | P-46 | 31000 |
| | S-9 | 0.8 | P-46 | 15300 |
| | S-9 | 1.0 | P-46 | 9400 |
| | S-9 | 2.0 | P-46 | 2300 |
| 184 | S-11 | 0.2 | P-46 | 20000 |
| | S-11 | 0.4 | P-46 | 7300 |
| | S-11 | 0.8 | P-46 | 1350 |
| | S-11 | 1.0 | P-46 | 900 |
| | S-11 | 2.0 | P-46 | 380 |
| 185 | S-13 | 0.2 | P-46 | 63500 |
| | S-13 | 0.4 | P-46 | 42000 |
| | S-13 | 0.8 | P-46 | 23000 |
| | S-13 | 1.0 | P-46 | 16000 |
| | S-13 | 2.0 | P-46 | 4850 |
| 186 | S-14 | 0.2 | P-46 | 36000 |
| | S-14 | 0.4 | P-46 | 25000 |
| | S-14 | 0.8 | P-46 | 11000 |
| | S-14 | 1.0 | P-46 | 9300 |
| | S-14 | 2.0 | P-46 | 1900 |
| 187 | S-16 | 0.2 | P-46 | 19000 |
| | S-16 | 0.4 | P-46 | 9300 |
| | S-16 | 0.8 | P-46 | 1250 |
| | S-16 | 1.0 | P-46 | 750 |
| | S-16 | 2.0 | P-46 | 290 |

EXAMPLES 188–232

Co-Thickening with Surfactants

The degree of ethoxylation of a surfactant added to an associative polymer solution influences the co-thickening effect. The results in Table N below show the co-thickening effect produced by the addition with thorough mixing of certain surfactants identified in Table M below in the amounts identified in Table N to a 0.3% (Examples 172–189), 0.5% (Examples 190–215) or 0.75% (Example 216) alkaline solution of an alkali soluble thickener identified in Table N as measured with a Brookfield Viscometer at 6 rpm at pH=9.0.

TABLE M

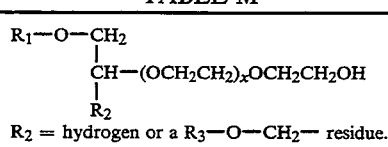

$R_2$ = hydrogen or a $R_3$—O—$CH_2$— residue.

| Surfactant | $R_1$ | $R_2/R_3$ | Moles of Ethoxylation |
|---|---|---|---|
| S-17 | Nonylphenol | Hydrogen ($R_2$) | 4 |
| S-18 | Nonylphenol | Hydrogen ($R_2$) | 6 |
| S-19 | Nonylphenol | Hydrogen ($R_2$) | 7 |
| S-20 | Nonylphenol | Hydrogen ($R_2$) | 8 |

TABLE M-continued $$R_1-O-CH_2$$
$$|$$
$$CH-(OCH_2CH_2)_xOCH_2CH_2OH$$
$$|$$
$$R_2$$

$R_2$ = hydrogen or a $R_3-O-CH_2-$ residue.

| Surfactant | $R_1$ | $R_2/R_3$ | Moles of Ethoxylation |
|---|---|---|---|
| S-21 | Nonylphenol | Hydrogen ($R_2$) | 9 |
| S-22 | Nonylphenol | Hydrogen ($R_2$) | 10 |
| S-23 | Nonylphenol | Hydrogen ($R_2$) | 15 |
| S-24 | Nonylphenol | Hydrogen ($R_2$) | 25 |
| S-25 | Nonylphenol | Hydrogen ($R_2$) | 40 |
| S-26 | Octylphenol | Hydrogen ($R_2$) | 1 |
| S-27 | Octylphenol | Hydrogen ($R_2$) | 3 |
| S-28 | Octylphenol | Hydrogen ($R_2$) | 5 |
| S-29 | Octylphenol | Hydrogen ($R_2$) | 7 |
| S-30 | Octylphenol | Hydrogen ($R_2$) | 9 |
| S-31 | Octylphenol | Hydrogen ($R_2$) | 12 |
| S-32 | Octylphenol | Hydrogen ($R_2$) | 16 |
| S-33 | C11–C15 Secondary Alcohol | Hydrogen ($R_2$) | 5 |
| S-34 | C11–C15 Secondary Alcohol | Hydrogen ($R_2$) | 9 |

TABLE N

| Example | Surfactant | Surfactant Concentration (wt. %) | Thickener | Brookfield Viscosity (cps) @ pH = 9.0 |
|---|---|---|---|---|
| 188 | S-17 | 0.8 | P-1 | 890 |
| 189 | S-18 | 0.8 | P-1 | 1340 |
| 190 | S-19 | 0.8 | P-1 | 630 |
| 191 | S-20 | 0.8 | P-1 | 205 |
| 192 | S-21 | 0.8 | P-1 | 143 |
| 193 | S-22 | 0.8 | P-1 | 113 |
| 194 | S-23 | 0.8 | P-1 | 85 |
| 195 | S-24 | 0.8 | P-1 | 57 |
| 196 | S-25 | 0.8 | P-1 | 68 |
| 197 | S-17 | 0.8 | P-3 | 17800 |
| 198 | S-18 | 0.8 | P-3 | 35800 |
| 199 | S-19 | 0.8 | P-3 | 21300 |
| 200 | S-20 | 0.8 | P-3 | 820 |
| 201 | S-21 | 0.8 | P-3 | 230 |
| 202 | S-22 | 0.8 | P-3 | 147 |
| 203 | S-23 | 0.8 | P-3 | 118 |
| 204 | S-24 | 0.8 | P-3 | 82 |
| 205 | S-25 | 0.8 | P-3 | 77 |
| 206 | S-17 | 0.8 | P-42 | 57000 |
| 207 | S-18 | 0.8 | P-42 | 134000 |
| 208 | S-19 | 0.8 | P-42 | 112000 |
| 209 | S-21 | 0.8 | P-42 | 2450 |
| 210 | S-22 | 0.8 | P-42 | 800 |
| 211 | S-23 | 0.8 | P-42 | 3250 |
| 212 | S-26 | 0.8 | P-42 | 43000 |
| 213 | S-27 | 0.8 | P-42 | 37000 |
| 214 | S-28 | 0.8 | P-42 | 71000 |
| 215 | S-29 | 0.8 | P-42 | 5800 |
| 216 | S-30 | 0.8 | P-42 | 375 |
| 217 | S-31 | 0.8 | P-42 | 650 |
| 218 | S-32 | 0.8 | P-42 | 2400 |
| 219 | S-17 | 0.8 | P-46 | 68000 |
| 220 | S-18 | 0.8 | P-46 | 13000 |
| 221 | S-19 | 0.8 | P-46 | 88000 |
| 222 | S-21 | 0.8 | P-46 | 2900 |
| 223 | S-22 | 0.8 | P-46 | 1400 |
| 224 | S-23 | 0.8 | P-46 | 2400 |
| 225 | S-26 | 0.8 | P-46 | 25000 |
| 226 | S-27 | 0.8 | P-46 | 38500 |
| 227 | S-28 | 0.8 | P-46 | 77000 |
| 228 | S-29 | 0.8 | P-46 | 7200 |
| 229 | S-30 | 0.8 | P-46 | 550 |
| 230 | S-31 | 0.8 | P-46 | 690 |
| 231 | S-32 | 0.8 | P-46 | 1775 |
| 232 | Aerosol ® OT | 0.0 | P-4 | 50500 |
|  | Aerosol ® OT | 0.1 | P-4 | 93500 |
|  | Aerosol ® OT | 0.2 | P-4 | 42000 |
|  | Aerosol ® OT | 0.4 | P-4 | 11200 |
|  | Aerosol ® OT | 0.8 | P-4 | 3700 |
|  | Aerosol ® OT | 1.0 | P-4 | 7200 |
|  | Aerosol ® OT | 2.0 | P-4 | 10600 |

EXAMPLES 233–245

Co-Thickening with Solvents and Non-Solvents

Solvents and non-solvents added to an associative polymer solution influences the co-thickening effect. The results in Table P below show the co-thickening effect produced by the addition with thorough mixing of certain solvents and non-solvents identified in Table O below in the amounts identified in Table P to a 0.75% alkaline solution of an alkali soluble thickener identified in Table P as measured with a Brookfield Viscometer at 6 rpm at pH=9.0.

TABLE O

| Solvent Designation | Solvent |
|---|---|
| O-1 | mineral spirits |
| O-2 | butanol |
| O-3 | Isobutanol |
| O-4 | Isopropanol |
| O-5 | 2-Ethylhexanol |
| O-6 | Butyl Carbitol |
| O-7 | Butyl DiPropasol |
| O-8 | Butyl Propasol |
| O-9 | Propyl DiPropasol |
| O-10 | Propyl Propasol |
| O-11 | Methyl DiPropasol |
| O-12 | Methyl Propasol |

TABLE P

| Example | Thickener | Solvent | Solvent Concentration (wt. %) | Solvent O-1 Concentration (wt. %) | Brookfield Viscosity (cps) @ pH = 9.0 |
|---|---|---|---|---|---|
| 233 | P-3 | O-6 | 5 | 0 | 29200 |
|  | P-3 | O-6 | 10 | 0 | 865 |
|  | P-3 | O-6 | 20 | 0 | 625 |
|  | P-3 | O-6 | 40 | 0 | 720 |
|  | P-3 | O-6 | 5 | 5 | 15400 |
|  | P-3 | O-6 | 10 | 5 | 1125 |
|  | P-3 | O-6 | 20 | 5 | 735 |
|  | P-3 | O-6 | 40 | 5 | 780 |
|  | P-3 | O-6 | 5 | 10 | 56500 |
|  | P-3 | O-6 | 10 | 10 | 1050 |
|  | P-3 | O-6 | 20 | 10 | 835 |
|  | P-3 | O-6 | 40 | 10 | 832 |

TABLE P-continued

| Example | Thickener | Solvent | Solvent Concentration (wt. %) | Solvent O-1 Concentration (wt. %) | Brookfield Viscosity (cps) @ pH = 9.0 |
|---|---|---|---|---|---|
|  | P-3 | O-6 | 5 | 20 | 41500 |
|  | P-3 | O-6 | 10 | 20 | 1625 |
| 234 | P-3 | O-7 | 0 | 0 | 76000 |
|  | P-3 | O-7 | 5 | 0 | 2150 |
|  | P-3 | O-7 | 10 | 0 | 3700 |
|  | P-3 | O-7 | 20 | 0 | 2000 |
|  | P-3 | O-7 | 0 | 5 | 89000 |
|  | P-3 | O-7 | 5 | 5 | 88000 |
|  | P-3 | O-7 | 10 | 5 | 50000 |
|  | P-3 | O-7 | 20 | 5 | 46500 |
|  | P-3 | O-7 | 0 | 10 | 102400 |
|  | P-3 | O-7 | 5 | 10 | 122000 |
|  | P-3 | O-7 | 10 | 10 | 72000 |
|  | P-3 | O-7 | 0 | 20 | 113000 |
|  | P-3 | O-7 | 5 | 20 | 158000 |
|  | P-3 | O-7 | 10 | 20 | 138000 |
| 235 | P-3 | O-8 | 5 | 0 | 1925 |
|  | P-3 | O-8 | 10 | 0 | 1150 |
|  | P-3 | O-8 | 20 | 0 | 2000 |
|  | P-3 | O-8 | 40 | 0 | 6200 |
| 236 | P-3 | O-9 | 5 | 0 | 36000 |
|  | P-3 | O-9 | 10 | 0 | 1200 |
|  | P-3 | O-9 | 20 | 0 | 440 |
|  | P-3 | O-9 | 40 | 0 | 1375 |
| 237 | P-3 | O-10 | 5 | 0 | 1375 |
|  | P-3 | O-10 | 10 | 0 | 45500 |
|  | P-3 | O-10 | 20 | 0 | 625 |
|  | P-3 | O-10 | 40 | 0 | 510 |
| 238 | P-3 | O-11 | 5 | 0 | 36000 |
|  | P-3 | O-11 | 10 | 0 | 20500 |
|  | P-3 | O-11 | 20 | 0 | 4200 |
|  | P-3 | O-11 | 40 | 0 | 550 |
| 239 | P-3 | O-12 | 0 | 0 | 76000 |
|  | P-3 | O-12 | 5 | 0 | 45000 |
|  | P-3 | O-12 | 10 | 0 | 24500 |
|  | P-3 | O-12 | 20 | 0 | 5800 |
|  | P-3 | O-12 | 40 | 0 | 675 |
|  | P-3 | O-12 | 5 | 5 | 51500 |
|  | P-3 | O-12 | 10 | 5 | 28500 |
|  | P-3 | O-12 | 20 | 5 | 7100 |
|  | P-3 | O-12 | 40 | 5 | 810 |
|  | P-3 | O-12 | 5 | 10 | 61200 |
|  | P-3 | O-12 | 10 | 10 | 33500 |
|  | P-3 | O-12 | 20 | 10 | 6400 |
|  | P-3 | O-12 | 40 | 10 | 950 |
|  | P-3 | O-12 | 5 | 20 | 86800 |
|  | P-3 | O-12 | 10 | 20 | 40500 |
|  | P-3 | O-12 | 20 | 20 | 7100 |
|  | P-3 | O-12 | 40 | 20 | 1350 |
| 240 | P-14 | O-7 | 0 | 0 | 150000 |
|  | P-14 | O-7 | 5 | 0 | 1350 |
|  | P-14 | O-7 | 10 | 0 | 4500 |
|  | P-14 | O-7 | 20 | 0 | 7000 |
|  | P-14 | O-7 | 0 | 5 | 140000 |
|  | P-14 | O-7 | 5 | 5 | 120000 |
|  | P-14 | O-7 | 10 | 5 | 78000 |
|  | P-14 | O-7 | 0 | 5 | 140000 |
|  | P-14 | O-7 | 5 | 10 | 158000 |
|  | P-14 | O-7 | 10 | 10 | 124000 |
|  | P-14 | O-7 | 0 | 20 | 136000 |
|  | P-14 | O-7 | 5 | 20 | 152000 |
|  | P-14 | O-7 | 10 | 20 | 142000 |
| 241 | P-3a | O-2 | 0 | 0 | 132600 |
|  | P-3a | O-2 | 5 | 0 | 17300 |
|  | P-3a | O-2 | 10 | 0 | 850 |
|  | P-3a | O-2 | 20 | 0 | 1425 |
|  | P-3a | O-2 | 40 | 0 | 4750 |
|  | P-3a | O-2 | 0 | 5 | 140000 |
|  | P-3a | O-2 | 5 | 5 | 67000 |
|  | P-3a | O-2 | 10 | 5 | 2500 |
|  | P-3a | O-2 | 20 | 5 | 3000 |
|  | P-3a | O-2 | 0 | 10 | 134000 |
|  | P-3a | O-2 | 5 | 10 | 33000 |
|  | P-3a | O-2 | 10 | 10 | 4000 |
|  | P-3a | O-2 | 20 | 10 | 4900 |
|  | P-3a | O-2 | 0 | 20 | 144000 |
|  | P-3a | O-2 | 5 | 20 | 49000 |
|  | P-3a | O-2 | 10 | 20 | 8000 |
| 242 | P-3a | O-3 | 5 | 0 | 28500 |

TABLE P-continued

| Example | Thickener | Solvent | Solvent Concentration (wt. %) | Solvent O-1 Concentration (wt. %) | Brookfield Viscosity (cps) @ pH = 9.0 |
|---|---|---|---|---|---|
| | P-3a | O-3 | 10 | 0 | 880 |
| | P-3a | O-3 | 20 | 0 | 1425 |
| | P-3a | O-3 | 40 | 0 | 4600 |
| | P-3a | O-3 | 5 | 5 | 80000 |
| | P-3a | O-3 | 10 | 5 | 2950 |
| | P-3a | O-3 | 20 | 5 | 3200 |
| | P-3a | O-3 | 40 | 5 | 6200 |
| | P-3a | O-3 | 5 | 10 | 78000 |
| | P-3a | O-3 | 10 | 10 | 5200 |
| | P-3a | O-3 | 20 | 10 | 6400 |
| | P-3a | O-3 | 5 | 20 | 136000 |
| | P-3a | O-3 | 10 | 20 | 20500 |
| 243 | P-3a | O-4 | 5 | 0 | 94000 |
| | P-3a | O-4 | 10 | 0 | 29000 |
| | P-3a | O-4 | 20 | 0 | 1050 |
| | P-3a | O-4 | 40 | 0 | 850 |
| | P-3a | O-4 | 5 | 5 | 107400 |
| | P-3a | O-4 | 10 | 5 | 39000 |
| | P-3a | O-4 | 20 | 5 | 1225 |
| | P-3a | O-4 | 40 | 5 | 900 |
| | P-3a | O-4 | 5 | 10 | 134000 |
| | P-3a | O-4 | 10 | 10 | 41000 |
| | P-3a | O-4 | 20 | 10 | 1350 |
| | P-3a | O-4 | 40 | 10 | 1050 |
| | P-3a | O-4 | 5 | 20 | 164000 |
| | P-3a | O-4 | 10 | 20 | 33000 |
| | P-3a | O-4 | 20 | 20 | 1825 |
| | P-3a | O-4 | 40 | 20 | 1350 |
| 244 | P-3a | O-5 | 5 | 0 | 93500 |
| | P-3a | O-5 | 10 | 0 | 136000 |
| | P-3a | O-5 | 20 | 0 | 178000 |
| 245 | P-3a | O-7 | 5 | 0 | 2700 |
| | P-3a | O-7 | 10 | 0 | 6100 |
| | P-3a | O-7 | 20 | 0 | 11900 |

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

We claim:

1. A process of thickening an aqueous composition comprising adding to the composition a polymer and at least partially neutralizing said polymer, wherein said polymer comprises the reaction product of:
   (A) about 1–99.9 weight percent of one or more alpha, beta-monoethylenically unsaturated carboxylic acids;
   (B) about 0–98.9 weight percent of one or more monoethylenically unsaturated monomers;
   (C) about 0.1–99 weight percent of one or more monoethylenically unsaturated macromonomers; and
   (D) about 0–20 weight percent or greater of one or more polyethylenically unsaturated monomers.

2. The process of claim 1 wherein the composition is thickened further by the addition of an effective amount of surfactant, solvent or non-solvent.

3. A process for thickening an aqueous composition which comprises:
   (1) adding a polymer to the aqueous composition which polymer is prepared by polymerizing monomers comprising:
      (a) about 1–99.9 weight percent of one or more alpha, beta-monoethylenically unsaturated carboxylic acids;
      (b) about 0–98.9 weight percent of one or more monoethylenically unsaturated monomers;
      (c) about 0.1–99 weight percent of one or more monoethylenically unsaturated macromonomers; and
      (d) about 0–20 weight percent or greater of one or more polyethylenically unsaturated monomers; and
   (2) dissolving the polymer in the aqueous composition.

4. The process of claim 3 wherein the aqueous composition is a latex paint composition wherein the polymer is dissolved in said paint composition in an amount of about 0.05 to about 5% by weight of the paint composition.

5. The process of claim 1 wherein said monoethylenically unsaturated macromonomer is represented by the formula:

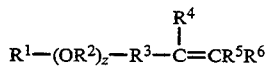

wherein:
$R^1$ is a monovalent residue of a substituted or unsubstituted complex hydrophobe compound;
each $R^2$ is the same or different and is a substituted or unsubstituted divalent hydrocarbon residue;
$R^3$ is a substituted or unsubstituted divalent hydrocarbon residue;
$R^4$, $R^5$ and $R^6$ are the same or different and are hydrogen or a substituted or unsubstituted monovalent hydrocarbon residue; and
z is a value of 0 or greater, in which said substituted or unsubstituted complex hydrophobe compound is represented by the formula selected from:

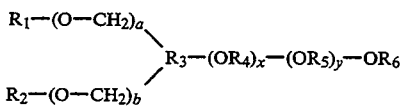

wherein $R_1$ and $R_2$ are the same or different and are hydrogen or a substituted or unsubstituted monovalent hydrocarbon residue, $R_3$ is a substituted or unsubstituted divalent or trivalent hydrocarbon residue, each $R_4$ is the same or different and is a substituted or unsubstituted divalent hydrocarbon residue, each $R_5$ is the same or different and is a substituted or unsubstituted divalent hydrocarbon residue, $R_6$ is hydrogen, a substituted or unsubstituted monovalent hydrocarbon residue or an ionic substituent, a and b are the same or different and are a value of 0 or 1, and x and y are the same or different and are a value of 0 or greater; provided at least two of $R_1$, $R_2$, $R_3$, $R_4$, $R_5$ and $R_6$ are a hydrocarbon residue having greater than 2 carbon atoms in the case of $R_1$, $R_2$ and $R_6$ or having greater than 2 pendant carbon atoms in the case of $R_3$, $R_4$ and $R_5$; and

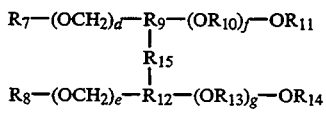

wherein $R_7$ and $R_8$ are the same or different and are hydrogen or a substituted or unsubstituted monovalent hydrocarbon residue, $R_9$ and $R_{12}$ are the same or different and are a substituted or unsubstituted divalent or trivalent hydrocarbon residue, each $R_{10}$ is the same or different and is a substituted or unsubstituted divalent hydrocarbon residue, each $R_{13}$ is the same or different and is a substituted or unsubstituted divalent hydrocarbon residue, $R_{11}$ and $R_{14}$ are the same or different and are hydrogen, a substituted or unsubstituted monovalent hydrocarbon residue or an ionic substituent, $R_{15}$ is a substituted or unsubstituted divalent hydrocarbon residue, d and e are the same or different and are a value of 0 or 1, and f and g are the same or different and are a value of 0 or greater; provided at least two of $R_7$, $R_8$, $R_9$, $R_{10}$, $R_{11}$, $R_{12}$, $R_{13}$, $R_{14}$ and $R_{15}$ are a hydrocarbon residue having greater than 2 carbon atoms in the case of $R_7$, $R_8$, $R_{11}$ an $R_{14}$ or having greater than 2 pendant carbon atoms in the case of $R_9$, $R_{10}$, $R_{12}$, $R_{13}$ and $R_{15}$.

6. The process of claim 5 wherein $R_1$, $R_2$, $R_7$ and $R_8$ are selected from substituted or unsubstituted alkyl, aryl, alkylaryl, arylalkyl, cycloalkyl or mixtures thereof.

7. The process of claim 5 wherein $R_1$, $R_2$, $R_7$ and $R_8$ are selected from dodecylphenyl, nonylphenyl, octylphenyl or mixtures thereof.

8. The process of claim 5 wherein each $R_4$, $R_5$, $R_{10}$ and $R_{13}$ is selected from $-CH_2CH_2-$, $-CH_2CH(CH_3)-$ or mixtures thereof.

9. The process of claim 5 wherein the values of x, y, f and g are from 0 to about 200 or greater.

10. The process of claim 5 in which said monoethylenically unsaturated macromonomer is represented by the formula selected from:

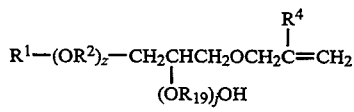

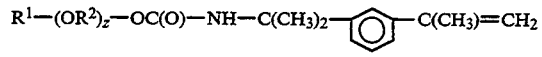

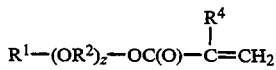

wherein $R^1$, $R^2$, $R^4$, and z are as defined in claim 5, each $R_{19}$ is the same or different and is a substituted or unsubstituted divalent hydrocarbon residue and j is a value of 0 or greater.

11. The process of claim 5 in which said component (A) is methacrylic acid, component (B) is ethyl acrylate, and component (C) contains styryl, acrylic, allylic, methacrylic or crotonic unsaturation.

12. The process of claim 3 wherein said monoethylenically unsaturated macromonomer is represented by the formula:

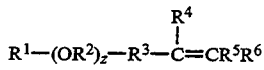

wherein:
$R^1$ is a monovalent residue of a substituted or unsubstituted complex hydrophobe compound;
each $R^2$ is the same or different and is a substituted or unsubstituted divalent hydrocarbon residue;
$R^3$ is a substituted or unsubstituted divalent hydrocarbon residue;
$R^4$, $R^5$ and $R^6$ are the same or different and are hydrogen or a substituted or unsubstituted monovalent hydrocarbon residue; and
z is s value of 0 or greater; in which said substituted or unsubstituted complex hydrophobe compound is represented by the formula selected from:

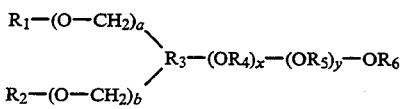

wherein $R_1$ and $R_2$ are the same or different and are hydrogen or a substituted or unsubstituted monovalent hydrocarbon residue, $R_3$ is a substituted or unsubstituted divalent or trivalent hydrocarbon residue, each $R_4$ is the same or different and is a substituted or unsubstituted divalent hydrocarbon residue, each $R_5$ is the same or different and is a substituted or unsubstituted divalent hydrocarbon residue, $R_6$ is hydrogen, a substituted or unsubstituted monovalent hydrocarbon residue or an ionic substituent, a and b are the same or different and are a value of 0 or 1, and x and y are the same or different and are a value of 0 or greater; provided at least two of $R_1$, $R_2$, $R_3$, $R_4$, $R_5$ and $R_6$ are a hydrocarbon residue having greater than 2 carbon atoms in the case of $R_1$, $R_2$ and $R_6$ or having greater than 2 pendant carbon atoms in the case of $R_3$, $R_4$ and $R_5$; and

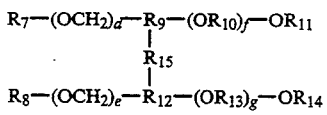

wherein $R_7$ and $R_8$ are the same or different and are hydrogen or a substituted or unsubstituted monovalent hydrocarbon residue, $R_9$ and $R_{12}$ are the same or different and are a substituted or unsubstituted divalent or trivalent hydrocarbon residue, each $R_{10}$ is the same or different and is a substituted or unsubstituted divalent hydrocarbon residue, each $R_{13}$ is the same or different and is a substituted or unsubstituted divalent hydrocarbon residue, $R_{11}$ and $R_{14}$ are the same or different and are hydrogen, a substituted or unsubstituted monovalent hydrocarbon residue or an ionic substituent, $R_{15}$ is a substituted or unsubstituted divalent hydrocarbon residue, d and e are the same or different and are a value of 0 or 1, and f and g are the same or different and are a value of 0 or greater; provided at least two of $R_7$, $R_8$, $R_9$, $R_{10}$, $R_{11}$, $R_{12}$, $R_{13}$, $R_{14}$ and $R_{15}$ are a hydrocarbon residue having greater than 2 carbon atoms in the case of $R_7$, $R_8$, $R_{11}$ an $R_{14}$ or having greater than 2 pendant carbon atoms in the case of $R_9$, $R_{10}$, $R_{12}$, $R_{13}$ and $R_{15}$.

13. The process of claim 12 wherein $R_1$, $R_2$, $R_7$ and $R_8$ are selected from substituted or unsubstituted alkyl, aryl, alkylaryl, arylalkyl, cycloalkyl or mixtures thereof.

14. The process of claim 12 wherein $R_1$, $R_2$, $R_7$ and $R_8$ are selected from dodecylphenyl, nonylphenyl, octylphenyl or mixtures thereof.

15. The process of claim 12 wherein each $R_4$, $R_5$, $R_{10}$ and $R_{13}$ is selected from —$CH_2CH_2$—, —$CH_2CH(CH_3)$— or mixtures thereof.

16. The process of claim 12 wherein the values of x, y, f and g are from 0 to about 200 or greater.

17. The process of claim 12 in which said monoethylenically unsaturated macromonomer is represented by the formula selected from:

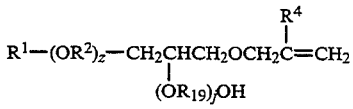

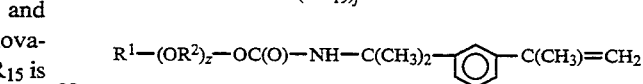

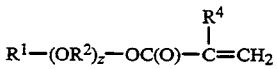

wherein $R^1$, $R^2$, $R^4$, and z are as defined in claim 12, each $R_{19}$ is the same or different and is a substituted or unsubstituted divalent hydrocarbon residue and j is a value of 0 or greater.

18. The process of claim 12 in which said component (A) is methacrylic acid, component (B) is ethyl acrylate, and component (C) contains styryl, acrylic, allylic, methacrylic or crotonic unsaturation.

* * * * *